United States Patent
Pedersen et al.

(10) Patent No.: US 9,418,081 B2
(45) Date of Patent: *Aug. 16, 2016

(54) METHODS AND SYSTEMS FOR ACCESSING REMOTE USER FILES ASSOCIATED WITH LOCAL RESOURCES

(71) Applicant: Citrix Systems, Inc., Fort Lauderdale, FL (US)

(72) Inventors: Brad Pedersen, Parkland, FL (US); Rick G. Braddy, Houston, TX (US); William T. Hardwood, Cambridge (GB); Christopher Fleck, Boca Raton, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 64 days.

This patent is subject to a terminal disclaimer.

(21) Appl. No.: 13/874,754

(22) Filed: May 1, 2013

(65) Prior Publication Data

US 2013/0246473 A1 Sep. 19, 2013

Related U.S. Application Data

(63) Continuation of application No. 11/875,515, filed on Oct. 19, 2007, now Pat. No. 8,452,812.

(60) Provisional application No. 60/862,335, filed on Oct. 20, 2006.

(51) Int. Cl.
*G06F 17/30* (2006.01)
*H04L 29/08* (2006.01)

(52) U.S. Cl.
CPC ...... *G06F 17/30283* (2013.01); *H04L 67/1095* (2013.01); *H04L 67/303* (2013.01); *H04L 67/306* (2013.01); *H04L 67/327* (2013.01); *H04L 67/34* (2013.01)

(58) Field of Classification Search
CPC .............. G06F 17/30899; G06F 17/30867; G06F 17/30283; H04L 67/1095; H04L 67/303; H04L 67/306; H04L 67/327; H04L 67/34

See application file for complete search history.

(56) References Cited

U.S. PATENT DOCUMENTS 5,872,971 A 2/1999 Knapman et al.
6,810,259 B1 * 10/2004 Zhang ...................... 455/456.5

(Continued)

OTHER PUBLICATIONS

European Exam Report on 07844449.4 dated Sep. 13, 2010.

(Continued)

*Primary Examiner* — Tarek Chbouki
(74) *Attorney, Agent, or Firm* — Foley & Lardner LLP; John D. Lanza

(57) ABSTRACT

A system for accessing, by a resource, a setting in a virtualized user profile includes an isolation environment, a resource, and a filter driver. The resource executes outside an isolation environment on a local machine and requests access to a setting in a user profile. The filter driver intercepts the request for access and identifies one of the isolation environment and a remote machine, responsive to an application of a rule to the request. The filter driver redirects the request to the one of the isolation environment and the remote machine. A method includes intercepting an instruction from a resource to modify a setting on a local machine, the resource provided by a local machine and executing outside of an isolation environment. The method includes identifying the isolation environment, responsive to an application of a rule to the instruction. The method includes redirecting the instruction to the isolation environment.

20 Claims, 10 Drawing Sheets

(56) References Cited

U.S. PATENT DOCUMENTS

| | | | |
|---|---|---|---|
| 7,461,249 | B1 | 12/2008 | Pearson et al. |
| 7,647,329 | B1* | 1/2010 | Fischman .......... G06F 17/30094 707/999.1 |
| 2002/0019941 | A1 | 2/2002 | Chan et al. |
| 2002/0078174 | A1* | 6/2002 | Sim ................... G06F 17/30194 709/219 |
| 2002/0099829 | A1 | 7/2002 | Richards et al. |
| 2002/0112155 | A1* | 8/2002 | Martherus et al. ............ 713/155 |
| 2002/0156911 | A1 | 10/2002 | Croman et al. |
| 2003/0126298 | A1 | 7/2003 | Redford et al. |
| 2004/0064480 | A1* | 4/2004 | Bartlett et al. ............. 707/104.1 |
| 2004/0215757 | A1* | 10/2004 | Butler .......................... 709/223 |
| 2005/0108297 | A1 | 5/2005 | Rollin et al. |
| 2005/0149481 | A1* | 7/2005 | Hesselink .......... H04L 63/0209 |
| 2005/0234866 | A1 | 10/2005 | Kyler |
| 2005/0251516 | A1 | 11/2005 | Stakutis et al. |
| 2006/0070029 | A1 | 3/2006 | Laborczfalvi et al. |
| 2006/0075381 | A1 | 4/2006 | Laborczfalvi et al. |
| 2006/0095266 | A1 | 5/2006 | McA'Nulty et al. |
| 2006/0123081 | A1 | 6/2006 | Baudino et al. |
| 2006/0155931 | A1 | 7/2006 | Birrell et al. |
| 2007/0043720 | A1* | 2/2007 | Koenig et al. ..................... 707/6 |
| 2007/0094667 | A1 | 4/2007 | Bissett et al. |
| 2007/0136745 | A1* | 6/2007 | Garbow et al. ................ 725/34 |
| 2007/0234359 | A1 | 10/2007 | Bernabeu-Auban et al. |
| 2008/0127355 | A1 | 5/2008 | Lorch et al. |
| 2010/0205666 | A1 | 8/2010 | Pernia |

OTHER PUBLICATIONS

European Exam Report on 07844449.4 dated Aug. 25, 2011.
International Search Report, PCT/US2007/081943, mailed on Sep. 4, 2008.
Marl C.,"User Data and Settings Management" , pp. 1-24, Jul. 23, 2003 (available at http://technet.microsoft.com/en-us/library/bb490855.aspx ).
Office Action on U.S. Appl. No. 11/875,515 dated Oct. 12, 2011.
Office Action on U.S. Appl. No. 11/875,515 dated May 6, 2011.
Office Action on U.S. Appl. No. 11/875,515 dated Oct. 25, 2010.
Office Action on U.S. Appl. No. 11/875,515 dated Nov. 24, 2009.
Office Action on U.S. Appl. No. 11/875,515 dated Sep. 2, 2012.
Office Action on U.S. Appl. No. 11/875,515 dated Apr. 24, 2012.
Office Action on U.S. Appl. No. 11/875,515 dated Apr. 28, 2010.
Written Opinion of International Searching Authority, PCT/US2007/081943, mailed on Sep. 4, 2008.
Notice of Allowance on U.S. Appl. No. 11/875,515 dated Jan. 31, 2013.
European Exam Report on 07844449.4 dated Dec. 8, 2015.

* cited by examiner

METHODS AND SYSTEMS FOR ACCESSING REMOTE USER FILES ASSOCIATED WITH LOCAL RESOURCES

RELATED APPLICATIONS

The present application claims priority to U.S. patent application Ser. No. 11/875,515, filed Oct. 19, 2007, entitled "Methods and Systems for Accessing Remote User Files Associated with Local Resources," which claims priority to U.S. Provisional Patent Application Ser. No. 60/862,335, entitled "Systems and Methods for Providing Distributed, Virtualized Access to User Data," filed Oct. 20, 2006, each of which is incorporated herein by reference.

FIELD OF THE INVENTION

The present disclosure relates to methods and systems for providing access to user files. In particular, the present disclosure relates to methods and systems for accessing, by local resources, virtualized user files.

BACKGROUND OF THE INVENTION

Administrators of modern enterprise environments may face many challenges when providing users with access to resources. One such challenge concerns providing a supportable environment on a target machine enabling execution of a resource without interfering with other resources, which may have conflicting requirements, and in environments in which the resource may not have been designed to run, while also providing users with access to user-specific files. Although some systems attempt to solve these challenges with roaming profiles, typically, these systems generate additional problems, including poor reconciliation, over-writing and corruption of files, conflicts when migrating between operating systems, prolonged log-on times, and a failure to support offline access.

Another concern in a typical enterprise environment involves the management of user-requested resources. Each user in the enterprise may request one or more additional, non-standard resources. Some users will install applications without informing an information technology (IT) department of the installation. This may result in the installation of applications with conflicting requirements from pre-approved and pre-installed applications, which can cause compatibility problems, create instability on the user system, and, in some cases, destabilize other users' access to approved resources.

BRIEF SUMMARY OF THE INVENTION

In one aspect, a system for accessing a setting in a user profile provides users with consistent data experiences across sessions, regardless of what access method users implement, with what device users interact, or from which location the users attempt to access resources. In another aspect, a system for accessing, by a local resource, a setting in a user profile includes an isolation environment, a resource, and a filter driver. The resource executes outside an isolation environment on a local machine and requests access to a setting in a user profile. The filter driver intercepts the request for access to the setting in the user profile. The filter driver identifies one of the isolation environment and a remote machine, responsive to an application of a rule to the request. The filter driver redirects the request for access to the setting in the user profile to the one of the isolation environment and the remote machine.

In one embodiment, the setting in the user profile includes a configuration file. In another embodiment, the setting in the user profile includes a registry key. In still another embodiment, the setting in the user profile includes a data file. In yet another embodiment, the setting in the user profile includes an executable file.

In still another aspect, a method for accessing, by a local resource, a setting in a virtualized user profile includes the step of intercepting a request from a resource for access to a setting in a user profile, the resource provided by a local machine and executing outside an isolation environment. The method includes the step of identifying one of the isolation environment and a remote machine, responsive to an application of a rule to the request. The method includes the step of redirecting, to the identified one of the isolation environment and the remote machine, the request for access to the setting in the user profile. In one embodiment, the method includes the step of transmitting, to the remote machine, an identification of a modification to the setting in the user profile.

In one embodiment, the method includes the step of intercepting a request from a resource for access to a setting in a user profile, the resource provided by a local machine and executing inside an isolation environment. In another embodiment, the method includes the step of identifying one of the isolation environment and a remote machine, responsive to an application of a rule to the request. In still another embodiment, the method includes the step of redirecting, to the identified isolation environment, the request for access to the setting in the user profile. In still even another embodiment, the method includes the step of identifying a modification to the setting in the user profile. In yet another embodiment, the method includes the step of transmitting, to the remote machine, an identification of the modification.

In still even another aspect, a system for modifying, by a local resource, a setting in a virtualized user profile includes an isolation environment on a local machine, a resource, and a filter driver. The resource executes on the local machine and outside the isolation environment. The filter driver intercepts an instruction from the resource to modify a setting on the local machine. The filter driver identifies the isolation environment, responsive to an application of a rule to the instruction. The filter driver redirects the request for access to the setting to the isolation environment.

In one embodiment, an agent, in communication with the filter driver, identifies the isolation environment. In another embodiment, the resource is an installer application selected by a user. In still another embodiment, a remote machine stores a copy of data associated with the isolation environment on the local machine. In still even another embodiment, a second remote machine stores data associated with a second isolation environment on the second remote machine, the data synchronized with the copy of the data stored on the remote machine and associated with the isolation environment on the local machine. In yet another embodiment, a second filter driver intercepts a request, by a second resource executing on the second remote machine, for access to a setting in a user profile on the second remote machine, and the second filter driver responds to the request with the synchronized data.

In yet another aspect, a method for modifying, by a local resource, a setting in a virtualized user profile includes the step of intercepting an instruction from a resource to modify a setting on a local machine, the resource provided by a local machine and executing outside of an isolation environment. The method includes the step of identifying the isolation environment, responsive to an application of a rule to the instruction. The request to modify the setting on the local machine is redirected to the isolation environment.

In one embodiment, an instruction from the resource to modify a setting in a user profile on the local machine is intercepted. In another embodiment, an instruction from the resource to install, on the local machine, at least one file associated with an application is intercepted. In still another embodiment, a copy of data associated with the isolation environment and stored on the remote machine is synchronized with a copy of the data associated with a second isolation environment stored on a second remote machine. In still even another embodiment, a request, by a second resource executing on the second remote machine, for access to a setting on the second remote machine is intercepted. In yet another embodiment, the request is responded to with the synchronized data associated with the second isolation environment on the second remote machine.

In one embodiment, a request, by a second resource executing on a remote machine, for access to a setting on the remote machine is intercepted. In another embodiment, the requested setting is retrieved from a copy of data stored on a second remote machine and associated with the isolation environment on the local machine, responsive to a determination that a second isolation environment on the second remote machine does not contain the file. In still another embodiment, the second resource is executed responsive to the retrieved setting.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION OF THE INVENTION

Figure 1A:
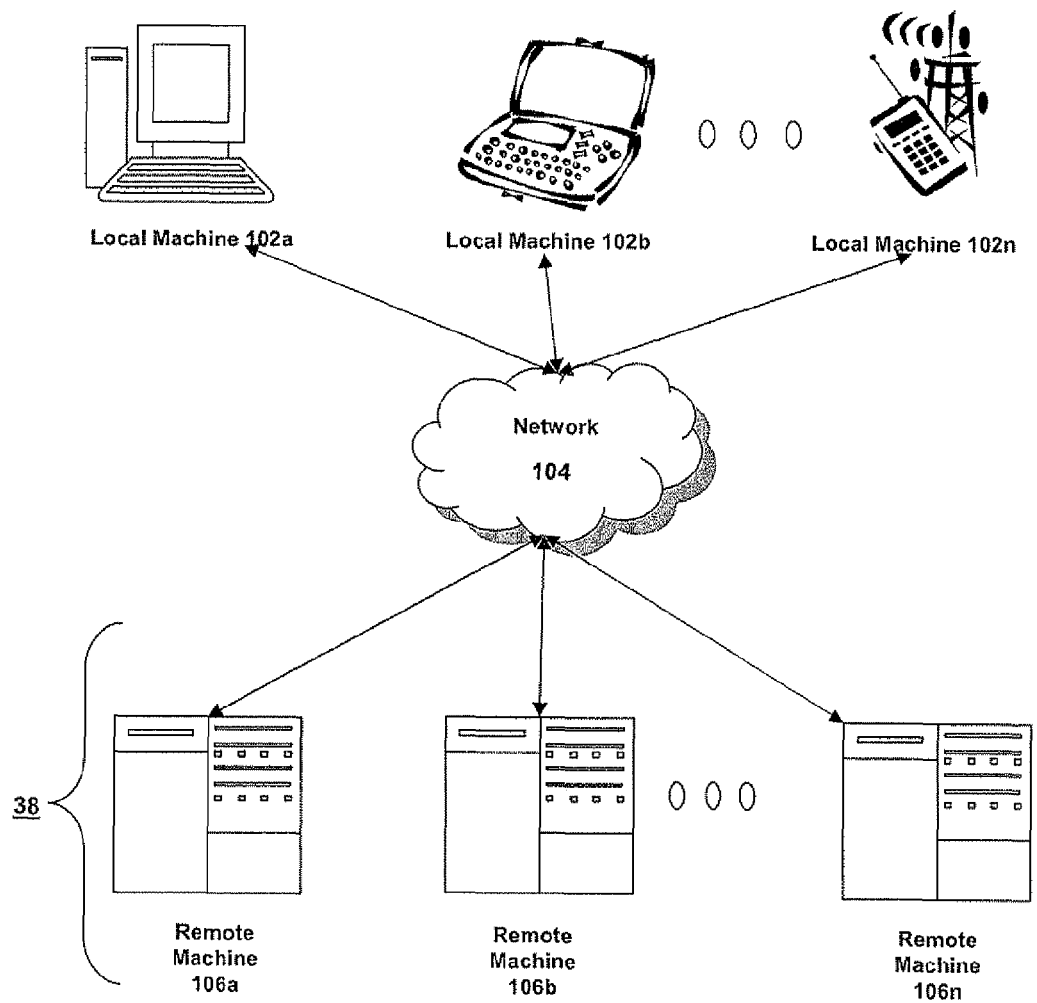
FIG. 1A is a block diagram depicting an embodiment of a network environment comprising local machines in communication with remote machines.

Referring now to FIG. 1A, an embodiment of a network environment is depicted. In brief overview, the network environment comprises one or more local machines 102a-102n (also generally referred to as client(s) 102, client node(s) 102, client computer(s) 102, client device(s) 102, or endpoint(s) 102) in communication with one or more servers 106a-106n (also generally referred to as server(s) 106, or remote machine(s) 106) via one or more networks 104.

Although FIG. 1A shows a network 104 between the local machines 102 and the servers 106, the local machines 102 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104, 104' between the local machines 102 and the servers 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped servers 106. In these embodiments, the logical group of servers may be referred to as a server farm 38. In some of these embodiments, the servers 106 may be geographically dispersed. In some cases, a farm 38 may be administered as a single entity. In other embodiments, the server farm 38 comprises a plurality of server farms 38. In one embodiment, the server farm executes one or more applications on behalf of one or more local machines 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). In some embodiments, a server 106 executes an application on behalf of a user or a local machine 102. In other embodiments, a server 106 executes a virtual machine, which provides an execution session within which applications execute on behalf of a user or a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

The servers 106 of each farm 38 do not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Server 106 may be a file server, application server, web server, proxy server, appliance, network appliance, gateway, application gateway, gateway server, virtualization server, deployment server, SSL VPN server, or firewall. In some embodiments, a server 106 provides a remote authentication dial-in user service, and is referred to as a RADIUS server. In other embodiments, a server 106 may have the capacity to function as either an application server or as a master application server. In still other embodiments, a server 106 is a blade server. In yet other embodiments, a server 106 executes a virtual machine providing, to a user or local machine 102, access to a computing environment.

In one embodiment, a server 106 may include an Active Directory. The server 106 may be an application acceleration appliance. For embodiments in which the server 106 is an application acceleration appliance, the server 106 may provide functionality including firewall functionality, application firewall functionality, or load balancing functionality. In some embodiments, the server 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

The local machines 102 may also be referred to as client nodes, client machines, endpoint nodes, or endpoints. In some embodiments, a local machine 102 has the capacity to function as both a client seeking access to resources provided by a server and as a server providing access to hosted resources for other local machines 102a-102n.

In some embodiments, a local machine 102 communicates with a server 106. In one embodiment, the local machine 102 communicates directly with one of the servers 106 in a farm 38. In another embodiment, the local machine 102 executes a program neighborhood application to communicate with a server 106 in a farm 38. In still another embodiment, the server 106 provides the functionality of a master node. In some embodiments, the local machine 102 communicates with the server 106 in the farm 38 through a network 104. Over the network 104, the local machine 102 can, for example, request execution of various applications hosted by the servers 106a-106n in the farm 38 and receive output data of the results of the application execution for display. In some embodiments, only the master node provides the functionality required to identify and provide address information associated with a server 106b hosting a requested application.

In one embodiment, the server 106 provides the functionality of a web server. In another embodiment, the server 106a receives requests from the local machine 102, forwards the requests to a second server 106b and responds to the request by the local machine 102 with a response to the request from the server 106b. In still another embodiment, the server 106 acquires an enumeration of applications available to the local machine 102 and address information associated with a server 106 hosting an application identified by the enumeration of applications. In yet another embodiment, the server 106 presents the response to the request to the local machine 102 using a web interface. In one embodiment, the local machine 102 communicates directly with the server 106 to access the identified application. In another embodiment, the local machine 102 receives output data, such as display data, generated by an execution of the identified application on the server 106.

In some embodiments, the server 106 or a server farm 38 may be running one or more applications, such as an application providing a thin-client computing or remote display presentation application. In one embodiment, the server 106 or server farm 38 executes as an application any portion of the CITRIX ACCESS SUITE by Citrix Systems, Inc., such as the METAFRAME or CITRIX PRESENTATION SERVER and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on a local machine 102. In some embodiments, the application may be a server-based or a remote-based application executed on behalf of the local machine 102 on a server 106. In one embodiments the server 106 may display output data to the local machine 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

Figure 1B:
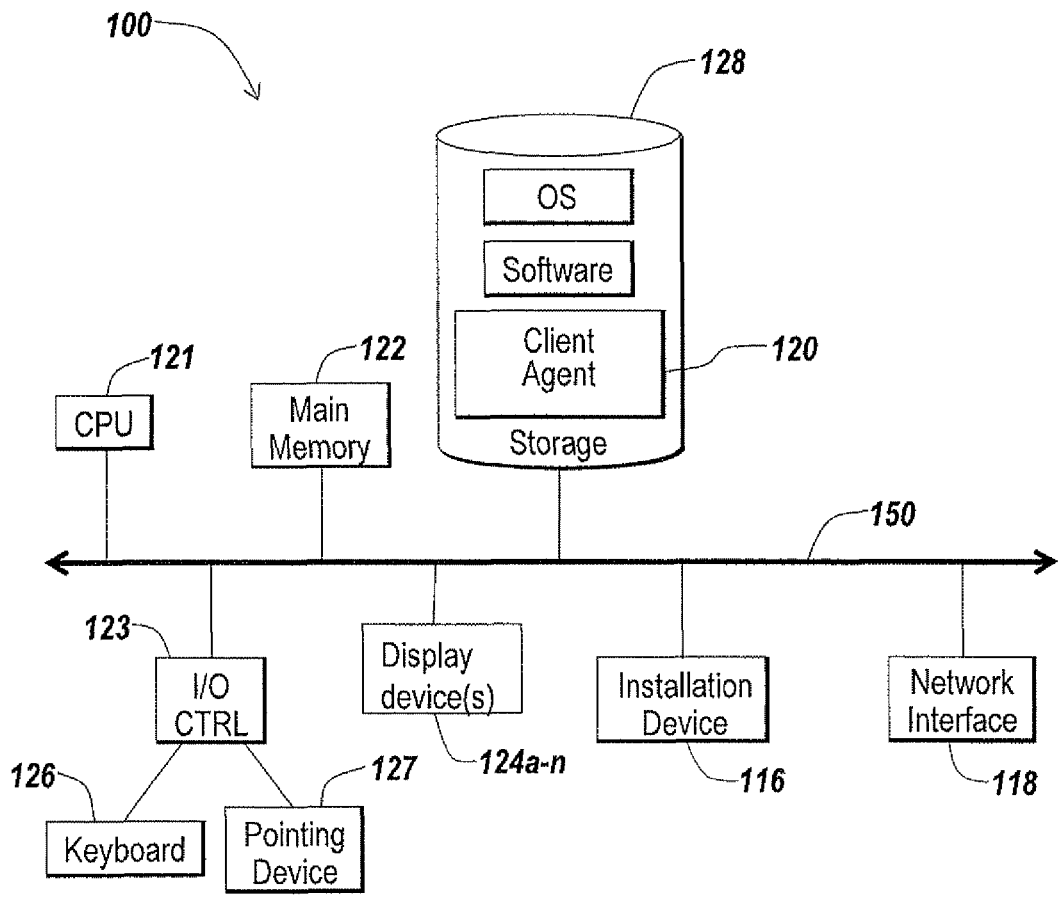
FIGS. 1B and 1C are block diagrams depicting embodiments of computing devices useful in connection with the methods and systems described herein.
Figure 1C:
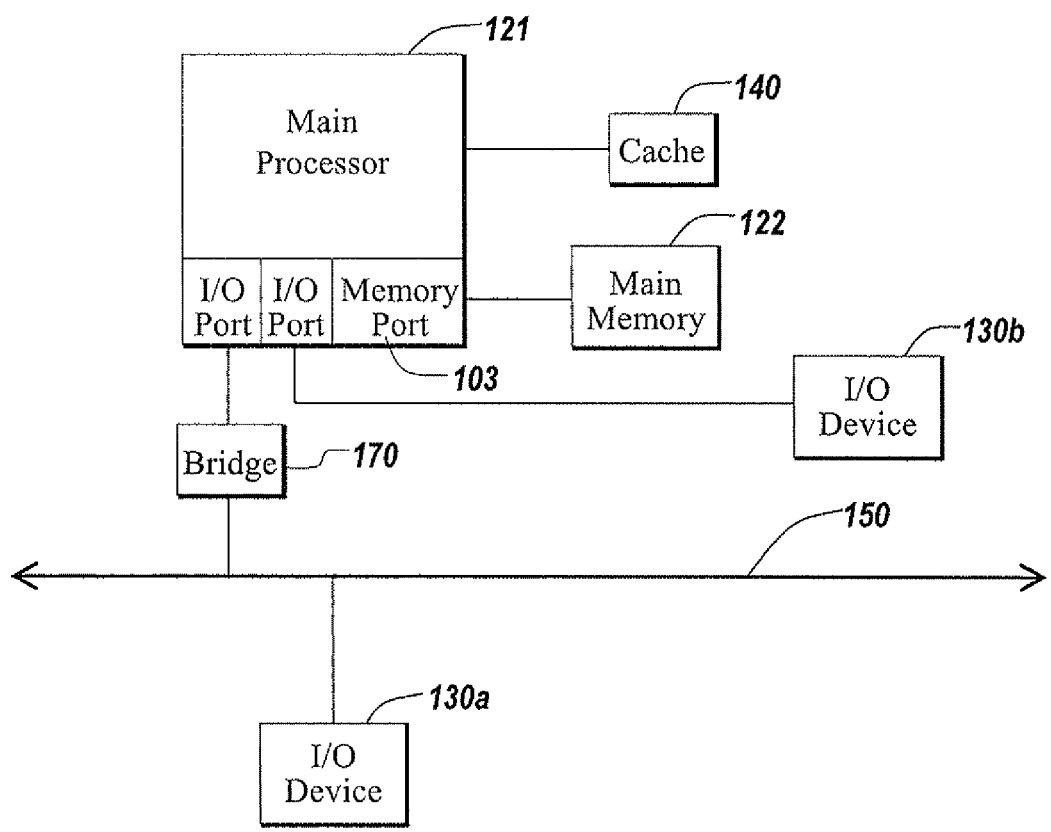

The local machine 102 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the local machine 102 or a server 106. As shown in FIGS. 1B and 1C, each computing device 100 includes a central processing unit 121, and a main memory unit 122. As shown in FIG. 1B, a computing device 100 may include a visual display device 124, a keyboard 126 and/or a pointing device 127, such as a mouse. As shown in FIG. 1C, each computing device 100 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360™ device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

In one embodiment, the server 106 includes a policy engine for controlling and managing the access to a resource, selection of an execution method for accessing the resource, and the delivery of resources. In another embodiment, the server 106 communicates with a policy engine. In some embodiments, the policy engine identifies the one or more resources a user or local machine 102 may access. In other embodiments, the policy engine determines how the resource should be delivered to the user or local machine 102, e.g., the method of execution. In still other embodiments, the server 106 provides, responsive to a determination made by the policy engine, a plurality of delivery techniques from which to select a method of execution, such as a server-based computing, application streaming, or delivering the application locally to the local machine 102 for local execution. In yet other embodiments, an enumeration of a plurality of resources available to the local machine 102 is provided responsive to a determination by a policy engine regarding whether and how a local machine may access a resource. The policy engine may collect information about the local machine prior to making the determination.

In some embodiments, a server 106 may select a method of providing access to the requested resource that requires the resource to execute within an isolation environment on the local machine 102. An isolation environment may consist of a core system able to provide file system virtualization, registry system virtualization, and named object virtualization. The isolation environment may redirect resource requests using hooking both in a user mode for registry and named object virtualization, and in a kernel using a file system filter driver for file system virtualization.

In some embodiments, a user isolation environment provides an isolation scope for each individual user. In other embodiments, the user isolation environment provides an isolation scope for a group of users, which may be defined by roles within the organization or may be predetermined by an administrator. In still other embodiments, no user isolation environment is provided. In still even other embodiments, a user isolation environment may be used in multi-user computers supporting concurrent execution of application programs by various users. In yet other embodiments, the user isolation environment may also be used on single-user computers.

Figure 2A:
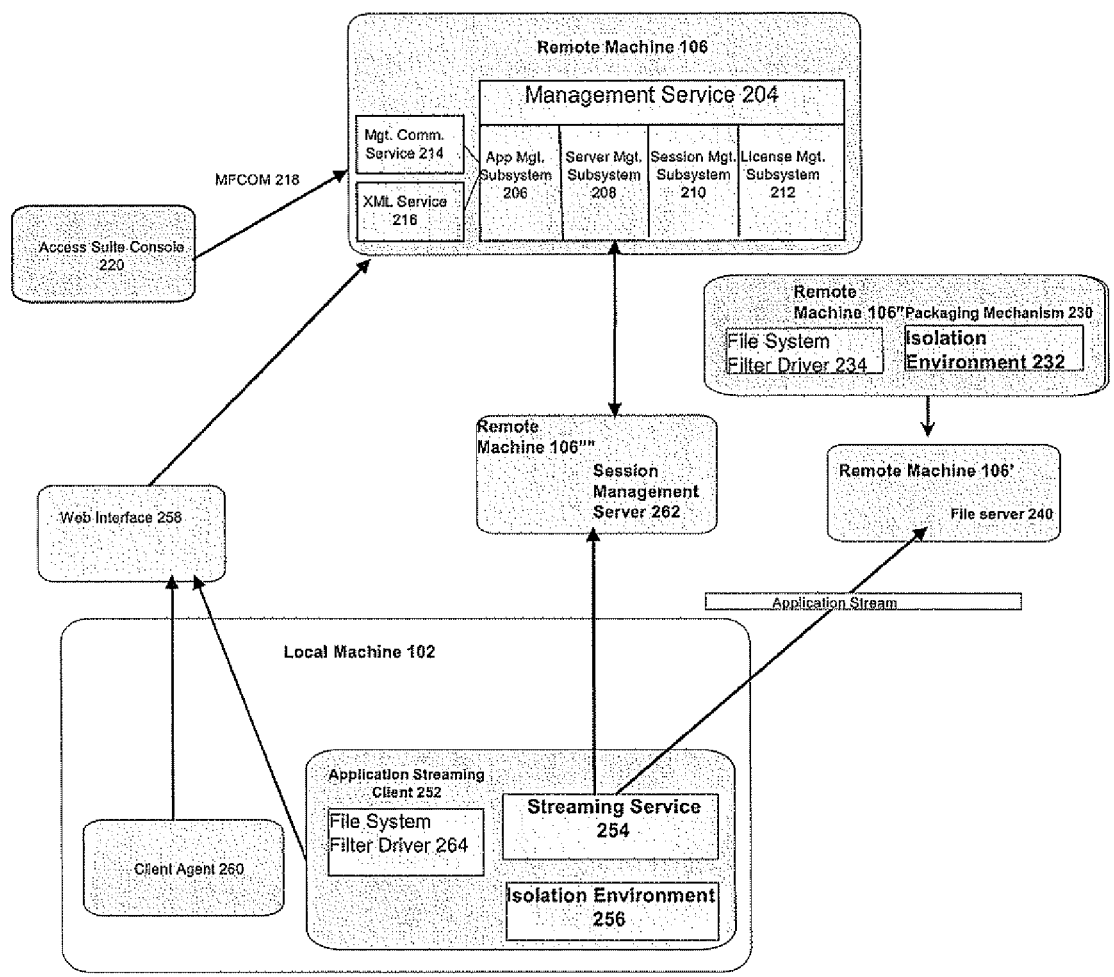
FIG. 2A is a block diagram depicting one embodiment of a local machine requesting execution of a resource and a remote machine providing access to the resource.

Referring now to FIG. 2A, a block diagram depicts one embodiment of the system in which a local machine 102 requests execution of a resource and a remote machine 106 selects a method of executing the resource. In one embodiment, the remote machine 106 receives credentials from the local machine 102. In another embodiment, the remote machine 106 receives a request for an enumeration of available resources from the local machine 102.

In some embodiments, multiple, redundant, remote machines 106, 106', 106'', 106''', and 106'''' are provided. In one of these embodiments, there may be, for example, multiple file servers, multiple session management servers, multiple staging machines, multiple web interfaces, or multiple access suite consoles. In another of these embodiments, if a remote machine fails, a redundant remote machine 106 is selected to provide the functionality of the failed machine. In other embodiments, although the remote machines 106, 106', 106'', 106''', and 106'''', and the web interface 258 and access suite console 220 are described as separate remote machines 106 having the separate functionalities of a management server, a session management server, a staging machine, a file server, a web server, and an access suite console, a single remote machine 106 may be provided having the functionality of all of these machines. In still other embodiments, a remote machine 106 may provide the functionality and services of one or more of the other remote machines.

Figure 2B:
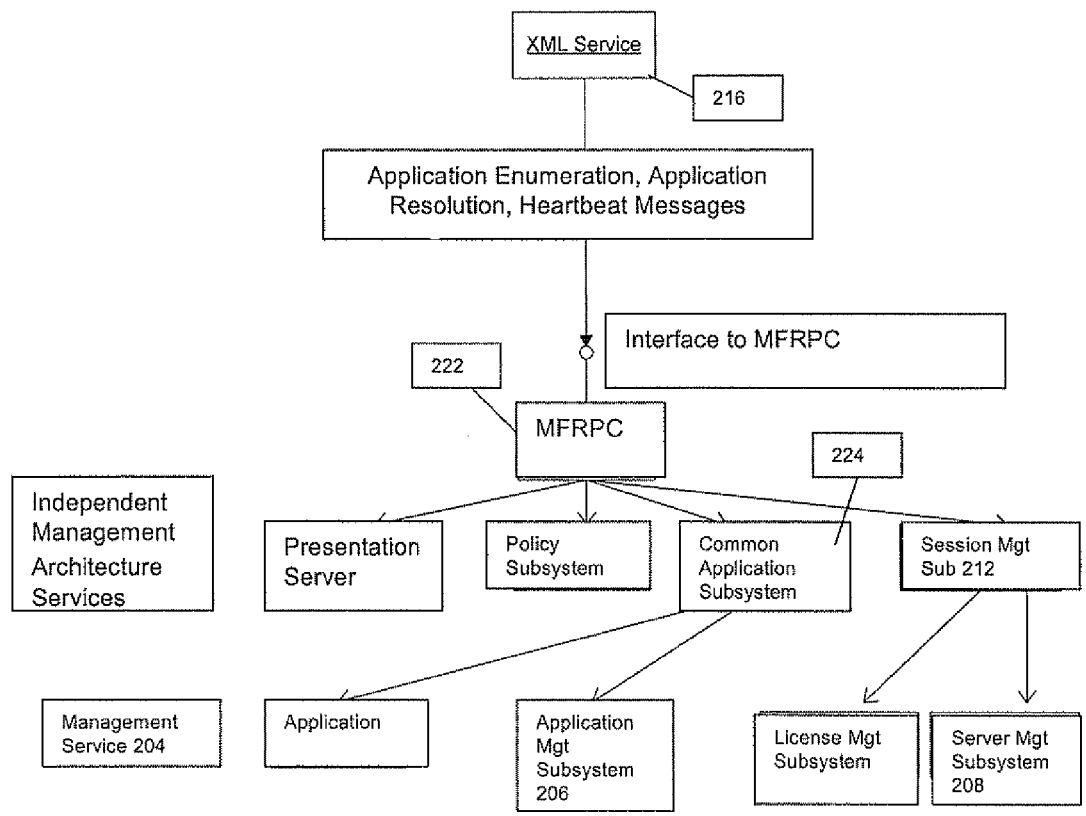
FIG. 2B is a block diagram depicting one embodiment of a remote machine including a management service providing an enumeration of available resources.

Referring now to FIG. 2A, and in connection with FIG. 2B, a block diagram depicts one embodiment of a remote machine 106 providing access to an application program. In some embodiments, the remote machine 106 may further include a management communication service 214, an XML service 216, and a management service 204. The management service 204 may comprise an application management subsystem 206, a server management subsystem 208, a session management subsystem 210, and a license management subsystem 212. The remote machine 106 may be in communication with an access suite console 220.

In one embodiment, the management service 204 further comprises a specialized remote procedure call subsystem, the MetaFrame Remote Procedure Call (MFRPC) subsystem 222. In some embodiments, the MFRPC subsystem 222 routes communications between subsystems on the remote machine 106, such as the XML service 216, and the management service 204. In other embodiments, the MFRPC subsystem 222 provides a remote procedure call (RPC) interface for calling management functions, delivers RPC calls to the management service 204, and returns the results to the subsystem making the call.

The remote machine 106 may be in communication with an access suite console 220. The access suite console 220 may host management tools to an administrator of a remote machine 106 or of a farm 38. In some embodiments, the remote machine 106 communicates with the access suite console 220 using XML. In other embodiments, the remote machine 106 communicates with the access suite console 220 using the Simple Object Access Protocol (SOAP).

In some embodiments, and as depicted in FIG. 2A, the management service 204 may comprise a plurality of subsystems. In one embodiment, each subsystem is either a single-threaded or a multi-threaded subsystem. A thread is an independent stream of execution running in a multi-tasking environment. A single-threaded subsystem is capable of executing only one thread at a time. A multi-threaded subsystem can support multiple concurrently executing threads, i.e., a multi-threaded subsystem can perform multiple tasks simultaneously.

The application management subsystem 206 manages information associated with a plurality of applications capable of being streamed. In one embodiment, the application management subsystem 206 handles requests from other components, such as requests for storing, deleting, updating, enumerating or resolving applications. In another embodiment, the application management subsystem 206 handles requests sent by components related to an application capable of being streamed. These events can be classified into three types of events: application publishing, application enumeration and application launching, each of which will be described in further detail below. In other embodiments, the application management subsystem 206 further comprises support for application resolution, application publication and application publishing. In other embodiments, the application management subsystem 206 uses a data store to store application properties and policies.

The server management subsystem 208 handles configurations specific to application streaming in server farm configurations. In some embodiments, the server management subsystem 208 also handles events that require retrieval of information associated with a configuration of a farm 38. In other embodiments, the server management subsystem 208 handles events sent by other components related to remote machines providing access to applications across application streams and properties of those remote machines. In one embodiment, the server management subsystem 208 stores remote machine properties and farm properties.

In some embodiments, the remote machine 106 further comprises one or more common application subsystems 224 providing services for one or more specialized application subsystems. These remote machines 106 may also have one or more common remote machine subsystem providing services for one or more specialized remote machine subsystems. In other embodiments, no common application subsystems 224 are provided, and each specialized application and remote machine subsystem implements all required functionality.

In one embodiment in which the remote machine 106 comprises a common application subsystem 224, the common application subsystem 224 manages common properties for published applications. In some embodiments, the common application subsystem 224 handles events that require retrieval of information associated with published applications or with common properties. In other embodiments, the common application subsystem 224 handles all events sent by other components related to common applications and their properties.

A common application subsystem 224 can "publish" applications to the farm 38, which makes each application available for enumeration and launching by a local machine 102. Generally, an application is installed on each remote machine 106 on which availability of that application is desired. In one embodiment, to publish an application, an administrator runs an administration tool specifying information such as the remote machines 106 hosting the application, the name of the executable file on each remote machine, the required capabilities of a local machine for executing the application (e.g., audio, video, encryption, etc.), and a list of users that can use the application. This specified information is categorized into resource-specific information and common information. Examples of resource-specific information are: the path name for accessing the application and the name of the executable file for running the application. Common information (i.e., common resource data) includes, for example, the user-friendly name of the resource (e.g., "Microsoft WORD 2000"), a unique identification of the resource, and the users of the resource.

The resource-specific information and common information may be sent to a specialized application subsystem controlling the application on each remote machine 106 hosting the application. The specialized resource subsystem may write the application-specific information and the common information into a persistent store.

When provided, a common application subsystem 224 also provides a facility for managing the published applications in the farm 38. Through a common application subsystem 224, an administrator can manage the applications of the farm 38 using an administration tool such as the access suite console 220 to configure application groups and produce an application tree hierarchy of those application groups. Each application group may be represented as a folder in the application tree hierarchy. Each application folder in the application tree hierarchy can include one or more other application folders and specific instances of remote machines. The common application subsystem 224 provides functions to create, move, rename, delete, and enumerate application folders.

In one embodiment, the common application subsystem 224 supports the application management subsystem 206 in handling application enumeration and application resolution requests. In some embodiments, the common application subsystem 224 provides functionality for identifying an application for execution responsive to a mapping between a type of data file and an application for processing the type of data file. In other embodiments, a second application subsystem provides the functionality for file type association.

In some embodiments, the remote machine 106 may further comprise a policy subsystem. A policy subsystem includes a policy rule for determining whether an application may be streamed to a local machine 102 upon a request by the local machine 102 for execution of the application. In some embodiments, the policy subsystem identifies a server access option associated with a streamed application published in the access suite console 220. In one of these embodiments, the policy subsystem uses the server access option as a policy in place of the policy rule.

The session monitoring subsystem 210 maintains and updates session status of an application streaming session associated with a local machine 102 and enforces license requirements for application streaming sessions. In one embodiment the session management subsystem 310 monitors sessions and logs events, such as the launching of an application or the termination of an application streaming session. In another embodiment, the session monitoring subsystem 210 receives communications, such as heartbeat messages, transmitted from the local machine 102 to the remote machine 106. In still another embodiment, the session management subsystem 210 responds to queries about sessions from management tools, such as tools within the access suite console 220. In some embodiments, the management service 204 further comprises a license management subsystem communicating with the session management subsystem to provide and maintain licenses to local machines for execution of applications.

In one embodiment, the management service 204 provides functionality for application enumeration and application resolution. In some embodiments, the management service 204 also provides functionality for application launching, session monitoring and tracking, application publishing, and license enforcement.

Referring now to 2B, a block diagram depicts one embodiment of a remote machine 106 comprising a management service providing an application enumeration. The management service 204 may provide application enumeration through the use of a web interface interacting with an XML service 216. In one embodiment, XML service 216 enumerates applications for a user of a local machine 102. In another embodiment, the XML service 216 implements the functionality of the ICA browser subsystem and the program neighborhood subsystem described above. The XML service 216 may interact with a management communications service 214. In one embodiment, the XML service 216 generates an application enumeration request using the management communications service 214. The application enumeration request may include a client type indicating a method of execution to be used when executing the enumerated application. The application enumeration request is sent to a common application subsystem 224. In one embodiment, the common application subsystem 224 returns an enumeration of applications associated with the client type of the application enumeration request. In another embodiment, the common application subsystem 224 returns an enumeration of applications available to the user of the local machine 102, the enumeration selected responsive to an application of a policy to a credential associated with the local machine 102. In still another embodiment, the enumeration of applications is returned and an application of a policy to the local machine 102 is deferred until an execution of an enumerated application is requested.

The management service 204 may provide application resolution service for identifying a second remote machine 106' hosting an application. In one embodiment, the second remote machine 106' is a file server or an application server. In some embodiments, the management service 204 consults a file including identifiers for a plurality of remote machines 106 hosting applications. In one embodiment, the management service 204 provides the application resolution service responsive to a request from a local machine 102 for execution of an application. In another embodiment, the management service 204 identifies a second remote machine 106' capable of implementing a different method of executing the application than a first remote machine 106. In some embodiments, the management service 204 identifies a first remote machine 106' capable of streaming an application program to a local machine 102 and a second remote machine 106' capable of executing the application program and providing application-output data generated responsive to the execution of the application program to the local machine 102.

In one embodiment, a web interface transmits an application resolution request to the XML service 216. In another embodiment, the XML service 216 receives an application resolution request and transmits the request to the MFRPC subsystem 222.

In one embodiment, the MFRPC subsystem 222 identifies a client type included with a received application resolution request. In another embodiment, the MFRPC subsystem applies a policy to the client type and determines to "stream" the application to the local machine 102. In this embodiment, the MFRPC subsystem 222 may forward the application resolution request to an application management subsystem 206. In one embodiment, upon receiving the application resolution request from the MFRPC subsystem 222, the application management subsystem 206 may identify a remote machine 106'" functioning as a session management server 262 for the local machine 102. In some embodiments, the local machine transmits a heartbeat message to the session management server 262. In another embodiment, the application management subsystem 206 may identify a remote machine 106' hosting a plurality of application files comprising the application to be streamed to the local machine 102.

In some embodiments, the application management subsystem 206 use a file enumerating a plurality of remote machines hosting the plurality of application files to identify the remote machine 106'. In other embodiments, the application management subsystem 206 identifies a remote machine 106' having an IP address similar to an IP address of the local machine 102. In still other embodiments, the application management subsystem 206 identifies a remote machine 106' having an IP address in a range of IP addresses accessible to the local machine 102.

In one embodiment, the MFRPC subsystem 222 applies a policy to the client type and determines that the application may be executed on a remote machine 106', the remote machine 106' transmitting application-output data generated by an execution of the application to the local machine 102. In this embodiment, the MFRPC subsystem 222 may forward the application resolution request to a common application subsystem 224 to retrieve an identifier of a host address for a remote machine 106'. In another embodiment, the identified remote machine 106' may transmit the application-output data to the local machine using a presentation level protocol such as ICA or RDP or X Windows. In still another embodiment, the remote machine 106' receives the application from a second remote machine 106' across an application streaming session. In yet another embodiment, upon completion of application enumeration and application resolution, access information is transmitted to the local machine 102 that includes an identification of a method of execution for an enumerated application and an identifier of a remote machine 106' hosting the enumerated application.

Referring back to FIG. 2A, the local machine 102 may include an application streaming client 252, a streaming service 254 and an isolation environment 256. The application streaming client 252 may be an executable program. In some embodiments, the application streaming client 252 may be able to launch another executable program. In other embodiments, the application streaming client 252 may initiate the streaming service 254. In one of these embodiments, the application streaming client 252 may provide the streaming service 254 with a parameter associated with executing an application program. In another of these embodiments, the application streaming client 252 may initiate the streaming service 254 using a remote procedure call.

The local machine 102 may include a client agent 260. The client agent 260 may provide functionality for associating a file type with an application program and selecting a method of execution of the application program responsive to the association. In one embodiment, the client agent 260 is a program neighborhood application.

In one embodiment, the local machine 102 requests execution of an application program and receives access information from a remote machine 106 regarding execution. In another embodiment, the application streaming client 252 receives the access information. In still another embodiment, the application streaming client 252 provides the access information to the streaming service 254. In yet another embodiment, the access information includes an identification of a location of a file associated with a plurality of application files comprising the application program.

In one embodiment, the streaming service 254 retrieves a file associated with a plurality of application files. In some embodiments, the retrieved file includes an identification of a location of the plurality of application files. In one of these embodiments, the streaming service 254 retrieves the plurality of application files. In another of these embodiments, the streaming service 254 executes the retrieved plurality of application files on the local machine 102. In other embodiments, the streaming service 254 transmits heartbeat messages to a remote machine to maintain authorization to retrieve and execute a plurality of application files.

In some embodiments, the retrieved file includes an identification of a location of more than one plurality of application files, each plurality of application files comprising a different application program. In one of these embodiments, the streaming service 254 retrieves the plurality of application files comprising the application program compatible with the local machine 102. In another of these embodiments, the streaming service 254 receives authorization to retrieve a particular plurality of application files, responsive to an evaluation of the local machine 102.

In some embodiments, the plurality of application files are compressed and stored on a file server within an archive file such as a CAB, ZIP, SIT, TAR, JAR or other archive file. In one embodiment, a plurality of application files stored in an archive file comprises an application program. In another embodiment, multiple pluralities of application files stored in an archive file each comprise different versions of an application program. In still another embodiment, multiple pluralities of application files stored in an archive file each comprise different application programs. In some embodiments, an archive file includes metadata associated with each file in the plurality of application files. In one of these embodiments, the streaming service 254 generates a directory structure responsive to the included metadata, which may be used to satisfy requests by application programs for directory enumeration.

In one embodiment, the streaming service 254 decompresses an archive file to acquire the plurality of application files. In another embodiment, the streaming service 254 determines whether a local copy of a file within the plurality of application files exists in a cache on the local machine 102 prior to retrieving the file from the plurality of application files. In still another embodiment, a file system filter driver 264 determines whether the local copy exists in the cache. In some embodiments, the streaming service 254 modifies a registry entry prior to retrieving a file within the plurality of application files.

In some embodiments, the streaming service 254 stores a plurality of application files in a cache on the local machine 102. In one of these embodiments, the streaming service 254 may provide functionality for caching a plurality of application files upon receiving a request to cache the plurality of application files. In another of these embodiments, the streaming service 254 may provide functionality for securing a cache on the local machine 102. In another of these embodiments, the streaming service 254 may use an algorithm to adjust a size and a location of the cache.

In some embodiments, the streaming service 254 creates an isolation environment 256 on the local machine 102. In one of these embodiments, the streaming service 254 uses an isolation environment application programming interface to create the isolation environment 256. In another of these embodiments, the streaming service 254 stores the plurality of application files in the isolation environment 256. In still another of these embodiments, the streaming service 254 executes a file in the plurality of application files within the isolation environment. In yet another of these embodiments, the streaming service 254 executes the application program in the isolation environment.

For embodiments in which authorization is received to execute an application on the local machine 102, the execution of the application may occur within an isolation environment 256. In some embodiments, a plurality of application files comprising the application is stored on the local machine 102 prior to execution of the application. In other embodiments, a subset of the plurality of application files is stored on the local machine 102 prior to execution of the application. In still other embodiments, the plurality of application files does not reside in the isolation environment 256. In yet other embodiments, a subset of the plurality of applications files do not reside on the local machine 102. Regardless of whether a subset of the plurality of application files or each application file in the plurality of application files reside on the local machine 102 or in isolation environment 256, in some embodiments, an application file in the plurality of application files may be executed within an isolation environment 256.

In some embodiments, isolation environments are used to provide additional functionality to the application streaming client 252. In one of these embodiments, an application program is executed within an isolation environment. In another of these embodiments, a retrieved plurality of application files resides within the isolation environment. In still another of these embodiments, changes to a registry on the local machine 102 are made within the isolation environment.

In some embodiments, the application streaming client 252 includes a file system filter driver 264 intercepting application requests for files. In one of these embodiments, the file system filter driver 264 intercepts an application request to open an existing file and determines that the file does not reside in the isolation environment 256. In another of these embodiments, the file system filter driver 264 redirects the request to the streaming service 254 responsive to a determination that the file does not reside in the isolation environment 256. The streaming service 254 may extract the file from the plurality of application files and store the file in the isolation environment 256. The file system filter driver 264 may then respond to the request for the file with the stored copy of the file. In some embodiments, the file system filter driver 264 may redirect the request for the file to a file server 240, responsive to an indication that the streaming service 254 has not retrieved the file or the plurality of application files and a determination the file does not reside in the isolation environment 256. In one embodiment, the streaming service 254 uses IOCTL commands to communicate with the filter driver. In another embodiment, communications to the file server 240 are received with the Microsoft SMB streaming protocol.

In some embodiments, the packaging mechanism 230 stores in a manifest file a list of file types published as available applications and makes this information available to application publishing software. In one of these embodiments, the packaging mechanism 230 receives this information from monitoring an installation of an application program into the isolation environment on the staging machine. In another of these embodiments, a user of the packaging mechanism 230 provides this information to the packaging mechanism 230. In other embodiments, application publishing software within the access suite console 220 consults the manifest file to present to a user of the access suite console 220 the possible file types that can be associated with the requested application being published. The user selects a file type to associate with a particular published application. The file type is presented to the local machine 102 at the time of application enumeration.

In one embodiment, the application streaming client 252 requests access information associated with the application program from the remote machine 106. In some embodiments, the application streaming client 252 receives an executable program containing the access information. In one of these embodiments, the application streaming client 252 receives an executable program capable of displaying on the local machine 102 application-output data generated from an execution of the application program on a remote machine. In another of these embodiments, the application streaming client 252 receives an executable program capable of retrieving the application program across an application streaming session and executing the application program in an isolation environment on the local machine 102. In this embodiment, the application streaming client 252 may execute the received executable program. In still another of these embodiments, the remote machine 106 selects an executable program to provide to the local machine 102 responsive to performing an application resolution.

Referring still to FIG. 2A, in one embodiment, the first client, capable of receiving the application stream, is an application streaming client 252. The application streaming client 252 receiving the file, retrieving an identification of a plurality of application files and at least one characteristic required for execution of the plurality of application files, responsive to the file, and determining whether the local machine 102 includes the at least one characteristic. In another embodiment, the second client is a client agent 260. In some embodiments, the client agent 260 receives the file from the application streaming client 252 responsive to a determination, by the application streaming client 252, that the local machine 102 lacks the at least one characteristic.

In some embodiments, an application executing on the local machine 102 enumerates files associated with the application using the Win32 FindFirstFile( ) and FindNextFile( ) API calls. In one of these embodiments, a plurality of application files comprises the application. In another of these embodiments, not all files in the plurality of application files reside on the local machine 102. In still another of these embodiments, the streaming service 254 retrieved the plurality of application file in an archived files but extracted only a subset of the plurality of application files. In yet another of these embodiments, the streaming service 254 and the file system filter driver 264 provide functionality for satisfying the enumeration request, even when the requested file does not reside on the local machine 102.

In one embodiment, the functionality is provided by intercepting the enumeration requests and providing the data as if all files in the plurality of application files reside on the local machine 102. In another embodiment, the functionality is provided by intercepting, by the file system filter driver 264, an enumeration request transmitted as an IOCTL command, such as IRP_MJ_DIRECTORY_CONTROL IOCTL. When the file system filter driver 264 intercepts the call, the file system filter driver 264 redirects the request to the streaming service 254. In one embodiment, the file system filter driver 264 determines that the requested enumeration resides in an isolation environment on the local machine 102 prior to redirecting the request to the streaming service 254. In another embodiment, the streaming service 254 fulfills the request using a file in the plurality of application files, the file including an enumeration of a directory structure associated with the plurality of application files. In still another embodiment, the streaming service 254 provides the response to the request to the file system filter driver 264 for satisfaction of the enumeration request.

Figure 3A:
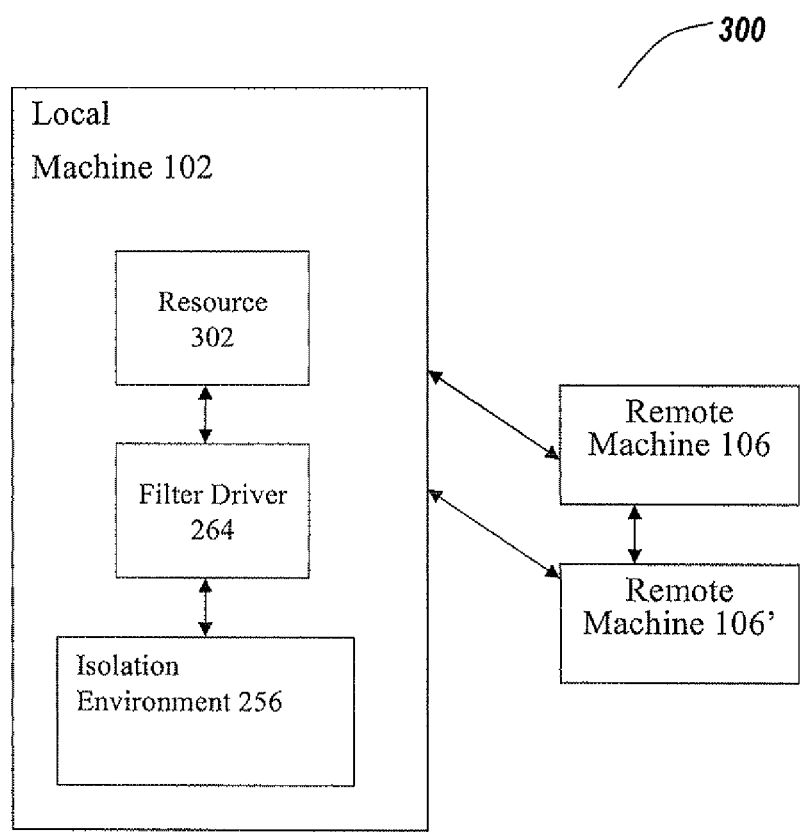
FIG. 3A is a block diagram depicting one embodiment of a system for accessing, by a local resource, a setting in a user profile.

Referring now to FIG. 3A, a system 300 for accessing, by a local resource, a setting in a user profile includes an isolation environment, a resource, and a filter driver. The resource 302 executes outside an isolation environment 256 on a local machine 102 and requests access to a setting in a user profile. The filter driver 264 intercepts the request for access to the setting in the user profile. The filter driver 264 identifies one of the isolation environment 256 and a remote machine 106, responsive to an application of a rule to the request. The filter driver 264 redirects the request for access to the setting in the user profile to the identified one of the isolation environment 256 and the remote machine 106.

In some embodiments, the system provides a user with access to a user profile, including personal files, configuration settings and registry keys associated with user-specific configurations. In one of these embodiments, the system provides the user with this access regardless of the computing environment from which the user makes the request; for example, a user may make a configuration change to an application from a first environment (such as a work desktop environment provided via a virtual machine), subsequently execute an application from a second environment (such as a home laptop providing access to the application via a method for thin-client computing) in which the application includes the configuration change made in the first environment. In other embodiments, the system provides a user with access, in a first environment, to synchronized personal files and settings, which are updated to include modifications previously made, by the user, to the files and settings, from a second environment.

Referring now to FIG. 3A, and in greater detail, the resource 302 executes outside the isolation environment 256 on a local machine 102 and requests access to a setting in a user profile. In one embodiment, a resource 302 is a program, an application, a document, a file, a plurality of applications, a plurality of files, an executable program file, a desktop environment, a computing environment, or other resource made available to a user of the local machine 102. In another embodiment, a resource 302' is executed to provide a user with access to a requested resource 302. For example, the user may request access to a file 302 on the local machine 102 and a resource 302' capable of processing the requested file 302 is executed on the local machine 102. In still another embodiment, a user may request access to a single resource 302 and receive access to a plurality of applications, desktops, or computing environments. In still even another embodiment, a user may request access to a resource 302 from a corporate machine, such as a desktop or laptop, or from an un-managed environment, such as a kiosk or personal machine. In yet another embodiment, the resource 302 may be delivered to the local machine 102 via a plurality of access methods including, but not limited to, installation directly on the local machine 102, delivery to the local machine 102 via a method for application streaming, delivery to the first machine 102 of output data generated by an execution of the resource 302 on a second machine 106*b* and communicated to the local machine 102 via a presentation layer protocol, delivery to the local machine 102 of output data generated by an execution of the resource 302 via a virtual machine executing on a second server 106*b*, or execution from a removable storage device connected to the local machine 102, such as a USB device.

In one embodiment, the requested setting in the user profile includes application configuration files allowing a user to customize an application. In another embodiment, the requested setting is a temporarily-stored Internet file. In still another embodiment, the setting identifies items stored in personal folders associated with a user including, but not limited to, folders storing cookies, URLs for favorite sites on the Internet, resources with shortcuts visible on the desktop, resources with shortcuts accessible via a particular menu (such as the Start Menu or a menu of recently accessed applications), folders storing templates, or "My Documents" folders. In yet another embodiment, the requested setting is a data file generated by the user during interaction with a resource 302.

In one embodiment, the requested setting is a registry key. In another embodiment, the requested setting is a configuration file. In still another embodiment, the requested setting is a data file for processing by an application. In yet another embodiment, the requested setting is an executable file. In some embodiments, the resource 302 requests access to a registry setting including, but not limited to, a desktop setting, a resource configuration, an application setting, or a security configuration file.

In one embodiment, the user profile stores a plurality of settings associated with a user. In another embodiment, the user profile stores a registry key associated with the user. In still another embodiment, the user profile stores a data file associated with the user. In yet another embodiment, the user profile stores a configuration file associated with the user.

In one embodiment, the user profile includes a plurality of settings and files that together define a personalized environment associated with a user. In another embodiment, the user profile is a collection of settings that contain user preferences and configuration settings including, but not limited to, screen color, application-specific configuration preferences, preferences associated with network connections, preferences associated with printer connections, input/output device settings, and window size and position preferences. In yet another embodiment, the user profile is a Windows profile.

In one embodiment, a user profile is associated with a user. In another embodiment, a user profile is associated with a group of users. In still another embodiment, when a user specifies a preference—for example, by resetting a default font, identifying a process for execution upon initiation of an operating system on the local machine, or changing a graphical display element, such as a theme, color, or background graphic—a setting in the user profile is updated to reflect the preference. In still even another embodiment, when a user specifies a preference, a setting in the user profile is generated; for example, a resource may generate a registry key, data file or configuration file to store an identification of the user-specified preference. In yet another embodiment, these preferences and settings provide the user with a customized, user-specific environment from session to session.

In one embodiment, the user profile includes a registry database storing settings for the user and the computer. In another embodiment, portions of the registry database may be stored in files referred to as hive files. In still another embodiment, the user profile includes a plurality of profile folders stored in a file system. In yet another embodiment, the profile folders store data files and configuration files, identifications of user-specified shortcuts, desktop images, documents, and other user-specific data.

In some embodiments, a user profile contains files and registry keys specific to an operating system on a local machine 102. In one of these embodiments, the user profile is a profile for a user of a local machine executing a WINDOWS operating system. In another of these embodiments, the user profile is a profile for a user of a local machine executing a MAC OS operating system. In still another of these embodiments, the user profile is a profile for a user of a local machine executing a UNIX or LINUX operating system. In other embodiments, a user profile generated in one environment may be accessed and applied to resources executing in a second environment. In one of these embodiments, the user profile is generated on a local machine executing a WINDOWS operating system and accessed by an application executing on a MAC OS operating system.

In some embodiments, the request is made for a setting in a user profile on a local machine. In one embodiment, a response to the request is provided from a user profile residing on a remote machine 106; for example, a file server 106' may store the user profile. In another embodiment, a response to the request is provided from the user profile residing on a local machine 102; for example, a cache memory element on the local machine 102 may store the user profile. In still another embodiment, a local machine 102 includes an isolation environment storing the user profile. In still even another embodiment, an isolation environment stores at least one setting in the user profile while a remote machine 106 stores a copy of the user profile in its entirety. In another embodiment, the remote machine 106 stores the user profile within an archive file such as a CAB, ZIP, SIT, TAR, JAR or other archive file. In yet another embodiment, both an isolation environment 256 on a local machine 102 and a remote machine 106 store a copy of the user profile.

In one embodiment, an administrator generates a group profile for a plurality of users. In another embodiment, the agent 320 creates an instance of the group profile for each user in the plurality of users. In still another embodiment, an agent 310 on the local machine 102 retrieves an instance of the group profile associated with a user of the local machine 102.

In yet another embodiment, the group profile contains configuration files modifying the behavior or appearance of resources executing on the local machine 102. In some embodiments, an administrator generates a group folder for a plurality of users, the group folder containing data files accessible to the plurality of users.

The filter driver 264 intercepts the request for access to the setting in the user profile and identifies one of the isolation environment 256 and a remote machine 106, responsive to an application of a rule to the request. In one embodiment, the filter driver 264 includes a network request interceptor. In another embodiment, the filter driver 264 is a filter driver as described above in connection with FIG. 2A-2B. In still another embodiment, the filter driver accesses at least one rule and applies the at least one rule to the request.

The filter driver 264 redirects the request for access to the setting in the user profile to the identified one of the isolation environment 256 and the remote machine 106. In some embodiments, the filter driver 264 is in communication with an agent 310. In one of these embodiments, the filter driver 264 forwards the intercepted request to the agent 310 for transmission to the remote machine 106. In still another of these embodiments, the filter driver 264 is a component in the agent 310.

Figure 3B:
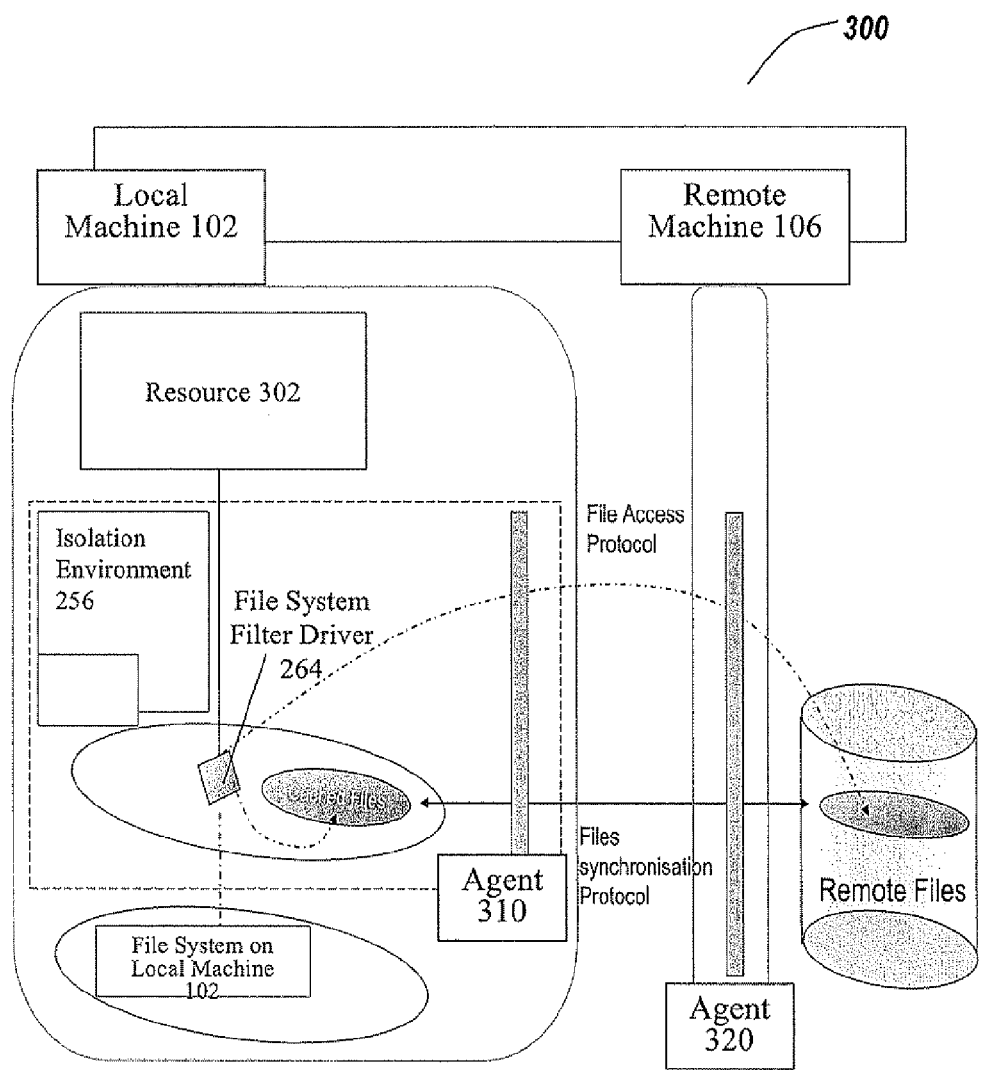
FIG. 3B is a block diagram depicting one embodiment of a system including a client agent for accessing, by a local resource, a setting in a user profile.

Referring now to FIG. 3B, a block diagram depicts an embodiment of a system including an agent for accessing a configuration file associated with a resource. In one embodiment, the agent 310, executing on the local machine 102, intercepts requests for content. In another embodiment, the agent 310 intercepts request for an Internet file; for example, the agent 310 may intercept a request for access to a list of bookmarked web sites or for a file storing web site content for offline access. In still another embodiment, the agent 310 intercepts a request for a data file for processing by an application.

In one embodiment, the agent 310 includes a network request interceptor. In another embodiment, the agent 310 includes a policy engine. In still another embodiment, the agent 310 accesses a set of policies and rules for application to requests. In yet another embodiment, the agent 310 includes the filter driver 264.

In some embodiments, the agent 310 includes a routing engine (not shown). In one of these embodiments, the routing engine determines whether to route the request for the setting to the isolation environment 256. In another of these embodiments, the routing engine determines whether to route the request for the setting to a cache element in the isolation environment 256. In still another embodiment, the routing engine determines whether to route the request for the setting to the remote machine 106. In yet another embodiment, the routing engine determines whether to route the request to an environment outside the isolation environment 256 on the local machine 102; for example, the routing engine may determine to send the request to a file system on the local machine 102. In other embodiments, the agent 310 includes at least one rule or policy, which the agent 310 accesses to determine whether to route the request to the isolation environment.

Figure 3C:
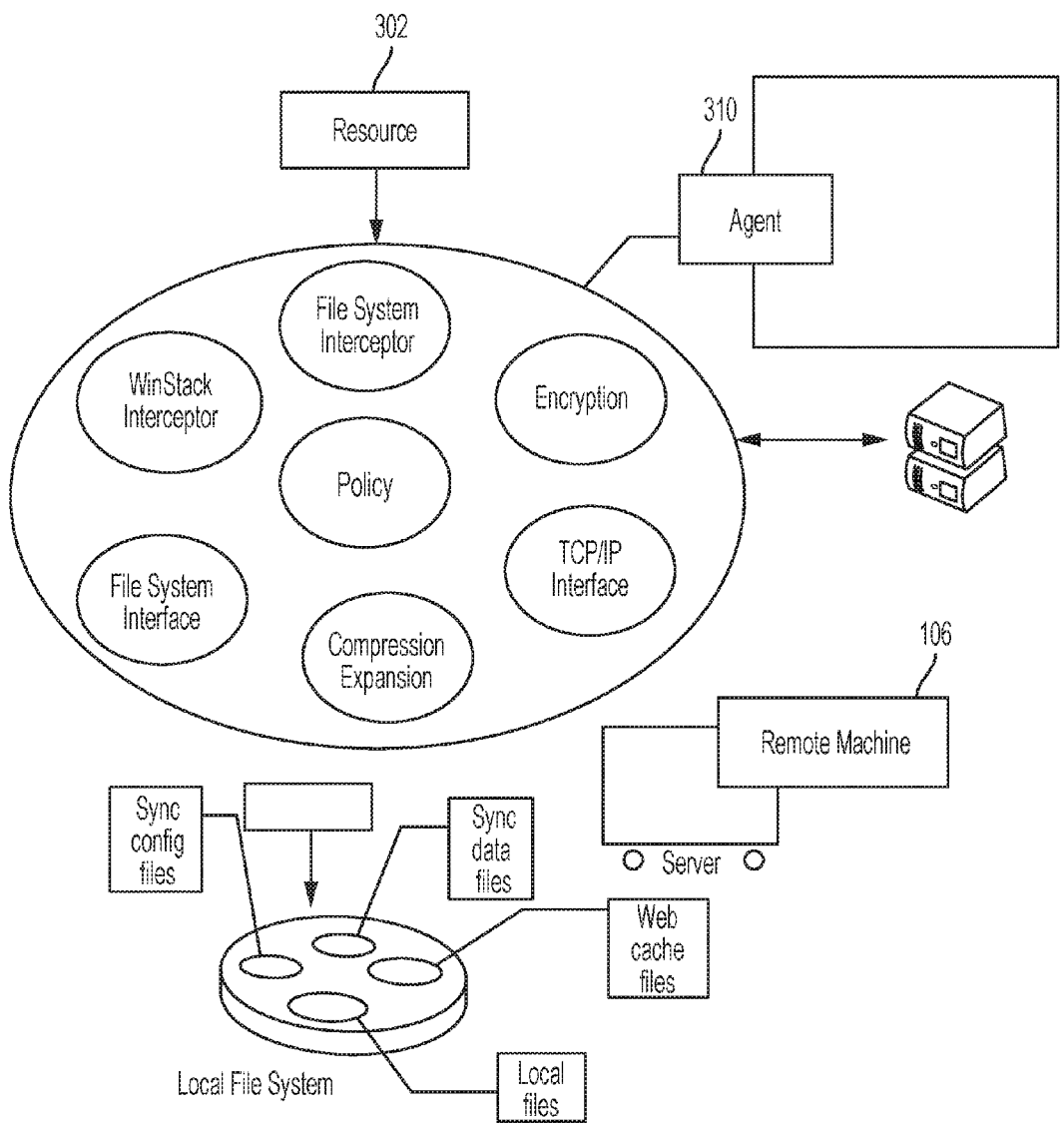
FIG. 3C is a block diagram depicting one embodiment of an agent in a system for accessing a setting in a user profile.

Referring now to FIG. 3C, a block diagram depicts one embodiment of an agent in a system for accessing a configuration file associated with a resource. In one embodiment, the agent 310 includes functionality for performing file system interception, functionality for operating system interception, a file system interface, a compression/expansion component, a network interface, an encryption component, and an interceptor for a communication stack, such as a WINSTACK interceptor intercepting communications in the TCP/IP stack.

In some embodiments, the agent 310 includes a synchronization component and synchronizes files in the isolation environment 256 with files in a remote isolation environment associated with a user of the local machine 102 and located on a remote machine 106. In one of these embodiments, the agent 310 includes a transceiver for exchanging synchronization messages with the remote machine 106. In other embodiments, the agent 310 includes an encryption component for encrypting and decrypting file system traffic sent and received by the local machine 102. In still other embodiments, the agent 310 includes a compression and decompression component for compressing and decompressing file system traffic sent and received by the local machine 102. In yet another embodiment, the agent 310 includes a network interface, such as a TCP/IP interface for communicating with the remote machine 106.

Referring back to FIG. 3B, the system 300 includes an agent 320 executing on the remote machine 106. In one embodiment, the agent 320 implements remote file access and file synchronization functions. In another embodiment, the agent 320 is implemented in Java and the file system access component may include a library that can be used to access network-based files from the remote machine 106. In some embodiments, the agent 320 includes an encryption component for encrypting and decrypting file system traffic sent and received by the remote machine 106. In other embodiments, the agent 320 includes a compression and decompression component for compressing and decompressing file system traffic sent and received by the remote machine 106.

Figure 4:
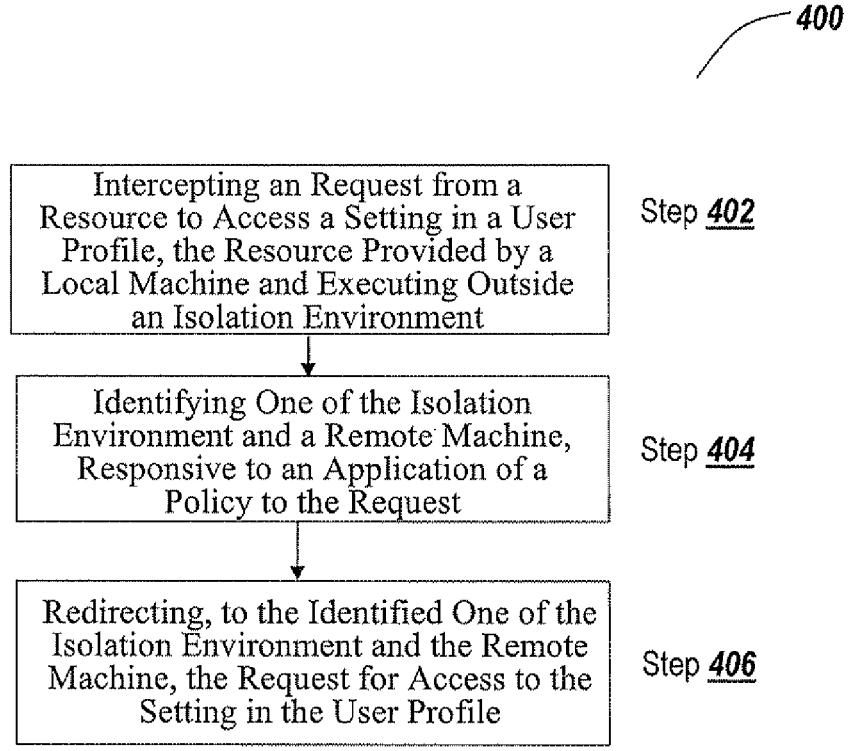
FIG. 4 is a flow diagram depicting one embodiment of the steps taken in a method for accessing a setting in a virtualized user profile.

Referring now to FIG. 4, a flow diagram depicts one embodiment of the steps taken in a method 400 for accessing a setting in a virtualized user profile associated with a resource. The method 400 includes the step of intercepting a request from a resource for access to a setting in a user profile, the resource provided by a local machine and executing outside an isolation environment (step 402). The method 400 includes the step of identifying one of the isolation environment and a remote machine, responsive to an application of a rule to the request (step 404). The method 400 includes the step of redirecting, to the identified one of the isolation environment and the remote machine, the request for access to the setting (step 406).

In some embodiments, the resource 302 executes outside an isolation environment 256 on a local machine 102 and requests access to a setting in a user profile stored on the local machine 102. In one of these embodiments, the filter driver 264 intercepts the request. In another of these embodiments, the filter driver 264 responds to the request with a copy of the setting stored by the isolation environment 256 instead of responding to the request with the setting stored on the local machine 102. In still another of these embodiments, the filter driver 264 responds to the request with a copy of a setting in a user profile stored on a remote machine 106 instead of responding to the request with the setting stored on the local machine 102. In yet another of these embodiments, the filter driver 264 forwards the intercepted request to an agent 310, which responds with a copy of a setting in a user profile stored on a remote machine 106.

With continued reference to FIG. 4, and in greater detail, a request from a resource for access to a setting in a user profile is intercepted, the resource provided by a local machine and executing outside an isolation environment (step 402). In some embodiments, the filter driver 264 does execute within an isolation environment 256. In other embodiments, the resource 302 executes within a second isolation environment 256'. In one embodiment, the filter driver 264 intercepts the request.

In one embodiment, the resource 302 executes on a local machine 102 that resides on a first network. In another embodiment, the resource 302 requests access to a setting in a user profile stored on the local machine 102 and a determination is made to respond to the request with a setting in a user profile stored on a remote machine 106 residing on a second network. In still another embodiment, the local machine 102 provides authentication credentials associated with a user of the local machine 102 to access the remote machine 106. In some embodiments, the remote machine 106 provides the resource 302 with access to a user profile stored on a second remote machine 106'. In one of these embodiments, the remote machine 106' resides on the same network as the remote machine 106. In another of these embodiments, the remote machine 106' resides on a third network. In still another of these embodiments, the second network, on which the remote machine 106 resides, and the third network, on which the remote machine 106' resides, are federated networks.

In some embodiments, a setting in a user profile is requested by a resource during initialization of a user session. For example, and in one of these embodiments, a user configuration file is retrieved and loaded at the beginning of a user session with a remote machine 106. In other embodiments, application settings are requested from a user profile and loaded upon execution of an application on the local machine 102. In still other embodiments, a setting is requested when a specific function is invoked by a resource.

One of an isolation environment and a remote machine is identified, responsive to an application of a rule to the request (step 404). In one embodiment, the filter driver 264 applies a rule to the intercepted request to identify one of the isolation environment 256 and the remote machine 106. In another embodiment, the filter driver 264 applies a rule to the intercepted request and forwards the intercepted request to an agent 310, responsive to the application of the rule. In still another embodiment, the filter driver 264 applies a rule and identifies the isolation environment 256. In yet another embodiment, the filter driver 264 forwards the intercepted request to the agent 310, responsive to a determination that the isolation environment 256 does not store a copy of the requested setting.

In some embodiments, the local machine 102 retrieves, from the remote machine 106, a copy of the user profile. In one of these embodiments, the isolation environment 256 stores the copy of the user profile; for example, the isolation environment 256 stores the copy of the user profile in a local cache memory element. In another of these embodiments, the isolation environment 256 stores a copy of the user profile and a remote machine 106' stores a second copy of the user profile. In still another of these embodiments, an identification is made as to which of the isolation environment 256 and the remote machine 106 should respond to the intercepted request for access to the setting in the user profile.

In other embodiments, the user profile is not copied to the local machine in its entirety. In one of these embodiments, a setting in the user profile is copied upon interception of a request for access to the setting. In another of these embodiments, copying settings upon request minimizes a length of time required to complete a user log-on process, since only portions of the user profile are copied to the local machine 102. In still another of these embodiments, a determination is made as to whether the isolation environment 256 has a copy of a requested setting and whether to transmit a copy of the requested setting to the isolation environment 256.

In some embodiments, a file system filter driver, or mini-filter, intercepts requests and determines if a process identifier associated with the intercepted request and with the resource has been associated with a set of rules. If so, the rules associated with the stored process identifier are used to virtualize the requests. If not, the access request is passed through to the file system or registry system unmodified. In other embodiments, a dynamically-linked library is loaded into the newly-created process and the library loads the isolation rules. In still other embodiments, both kernel mode techniques (hooking, filter driver, mini-filter) and user-mode techniques are used to intercept access calls. For embodiments in which a file system filter driver stores the rules, the library may load the rules from the file system filter driver.

In some embodiments, rules associated with an isolation environment are retrieved. In other embodiments, the rules are associated with the requested setting. In still other embodiments, the rules are associated with the resource making a request. In still even other embodiments, the rules are retrieved from a persistent storage element, such as a hard disk drive or other solid state memory element. The rules may be stored as a relational database, flat file database, tree-structured database, binary tree structure, or other persistent data structure. In yet other embodiments, the rules may be stored in a data structure specifically configured to store them.

In one embodiment, an identifier for the resource, such as a process id (PID), and the retrieved rules are stored in a memory element. In some embodiments, a kernel mode driver is provided that receives operating system messages concerning new process creation. In these embodiments, the PID and the retrieved rules may be stored in the context of the driver. In other embodiments, a file system filter driver, or mini-filter, is provided that intercepts requests. In these embodiments, the PID and the retrieved rules may be stored in the filter. In other embodiments still, interception is performed by user-mode hooking and no PID is stored at all.

In one embodiment, the identification of the one of the isolation environment and the remote machine is made responsive to an application of a rule to a characteristic of the local machine. In some embodiments, a determination is made as to whether the local machine 102 has access to a network on which the remote machine 106 resides. In one of these embodiments, a determination is made as to whether a user of the local machine 102 is authorized to access a resource provided by the local machine. In another embodiment, a determination is made as to whether the local machine 102 has an active Internet connection. In still another of these embodiments, a determination is made as to whether the local machine can access the remote machine 106 either via an intranet on which both machines 102 and 106 reside or via the Internet. In other embodiments, an identification is made of an environment on the local machine outside the isolation environment 256; for example, the local file system may include a copy of a user profile. Table 1 depicts one embodiment of a set of rules for application:

TABLE 1

Use of Local Cache vs. Use of Network File System

| Rule Name | Files in Isolation Environment | Files on Remote Machine | Sync | Local files |
|---|---|---|---|---|
| Mobile | Use: Off | Use: On line | Sync when | Pass |

TABLE 1-continued

Use of Local Cache vs. Use of Network File System

| Rule Name | Files in Isolation Environment | Files on Remote Machine | Sync | Local files |
|---|---|---|---|---|
| | line only Sync: on line | | online Sync: on line | through |
| Laptop Backup | Use: always | | | |
| Wireless | Use: If high latency or low bandwidth | Use: If low latency and high bandwidth | Sync: when adequate bandwidth | |
| Network Master | Use: always | | Sync: when file first accessed and online (i.e. sync file before use when possible) | |
| Wireless Network Master | Use: If high latency or low bandwidth | Use: If high bandwidth and low latency | Sync: If high bandwidth before local use. | |

In one embodiment, either the isolation environment 256 or the remote machine 106' is selected to respond to the intercepted request for access to a setting in the user profile. In another embodiment, if the local machine 102 lacks a network connection or experiences poor network performance, the isolation environment 256 is selected to respond to the request. In still another embodiment, and as will be described in greater detail below, if a user modifies a setting in the user profile while using the copy in the isolation environment 256, the agent 310 synchronizes the modified local version with the copy of the setting on the remote machine 106'. In still even another embodiment, if the local machine 102 has a network connection or experiences strong network performance, the remote machine 106' is selected to respond to the request. In yet another embodiment, if the local machine 102 has a more recent version of the setting—one having a date and time of last modification that is more recent than the date and time of a version on the remote machine 106'—then the isolation environment 256 is selected to respond to the request.

The request for access to the setting in the user profile is redirected to the identified one of the isolation environment and the remote machine (step 406). In one embodiment, the isolation environment 256 responds to the request with a setting retrieved from a copy of the user profile stored by the isolation environment 256 and synchronized with a copy of the user profile stored by the remote machine 106. In another embodiment, the isolation environment 256 responds to the request with a copy of the setting retrieved from the user profile stored on the local machine. In still another embodiment, the remote machine 106 transmits, to the agent 310, the setting from a copy of the user profile maintained by the remote machine 106. In still another embodiment, the agent 310 responds to the request with a setting received from the remote machine 106.

In one embodiment, the resource 302 modifies a resource configuration setting, responsive to processing a configuration file received from the identified one of the isolation environment 256 and the remote machine 106. In another embodiment, the resource 302 modifies a resource configuration setting, responsive to processing a registry key received from the identified one of the isolation environment 256 and the remote machine 106. In still another embodiment, the resource 302 displays, to the user, a user data file, responsive to processing a data file received from the identified one of the isolation environment 256 and the remote machine 106. In yet another embodiment, the resource 302 executes according to an instruction in a setting from the user profile.

In one embodiment, the user changes a configuration preference, resulting in the modification of a configuration file in the user profile. In another embodiment, the user modifies a data file in the user profile. In still another embodiment, the user generates a new data file, configuration file or registry key in the user profile.

In one embodiment, a determination is made as to when to synchronize a modified setting in a user profile stored on one of the isolation environment 256 and the remote machine 106 with a version of the setting in a second copy of the user profile. In another embodiment, a determination is made to synchronize the modified setting with the copy of the setting upon initiation of a log-off procedure by a user. In still another embodiment, a determination is made to synchronize a modified file with the copy of the file upon closing of a file in the user profile. In yet another embodiment, a determination is made to periodically synchronize the modified setting with the copy of the setting; for example, upon expiration of a timer or at user-specified time intervals. In some embodiments, the agent 310 makes the determination as to when to synchronize the settings in the use profile and performs the synchronization.

In some embodiments, a user accessing a resource 302 executing outside an isolation environment modifies a setting in a user profile stored on an isolation environment 256. In one of these embodiments, the setting is tagged to indicate that the user modified the setting. In another of these embodiments, an identification of a change to the modified setting is transmitted to the remote machine 106 when the local machine 102 and the remote machine 106. In still another of these embodiments, the modified setting is transmitted to the remote machine 106.

In other embodiments, a user accessing a resource 302 executing outside an isolation environment 256 modifies a setting in a user profile stored on a remote machine 106. In one of these embodiments, the setting is tagged to indicate that the user modified the setting. In another of these embodiments, an identification of a change to the modified setting is transmitted to the isolation environment 256 when the local machine 102 and the remote machine 106 synchronize a copy of the user profile on the isolation environment 256 with a copy of the user profile on the remote machine 106. In still another of these embodiments, the modified setting is transmitted to the isolation environment 256.

In some embodiments, a user accessing a resource 302 executing inside an isolation environment 256 modifies a setting in a user profile stored on the isolation environment 256. In one of these embodiments, the setting is tagged to indicate that the user modified the setting. In another of these embodiments, an identification of a change to the modified setting is transmitted to the remote machine 106 when the local machine 102 and the remote machine 106. In still another of these embodiments, the modified setting is transmitted to the remote machine 106.

In other embodiments, a user accessing a resource 302 executing inside an isolation environment 256 modifies a setting in a user profile stored on a remote machine 106. In one of these embodiments, the setting is tagged to indicate that the user modified the setting. In another of these embodiments, an identification of a change to the modified setting is transmitted to the isolation environment 256 when the local machine 102 and the remote machine 106 synchronizes a copy of the user profile on the isolation environment 256 with a copy of the user profile on the remote machine 106. In still another of these embodiments, the modified setting is transmitted to the isolation environment 256.

In one embodiment, a determination is made as to which files in a user profile stored by the isolation environment 256 changed since the previous synchronization with the files in the user profile stored on the remote machine 106'. In another embodiment, the determination is made by comparing modification dates and then transmitting block checksum information for those files which have changed. In still another embodiment, the block checksum data is then used to determine which blocks of data are missing on each machine and to generate a schedule of block updates. The generated schedule of block uploads and downloads is then performed.

In one embodiment, a user of a local machine 102 executes a resource on the local machine 102, which accesses a version of a user profile provided by an isolation environment 256 and executes according to a setting retrieved from the version of the user profile. In another embodiment, the user of the local machine 102 modifies a setting in the user profile; for example, by changing a setting in an application or desktop environment. In still another embodiment, the filter driver 264 intercepts a request by the resource to save the modification. In still even another embodiment, the filter driver 264 redirects the request to an isolation environment 256 where a copy of the setting in the user profile is modified. In another embodiment, the agent 410 stores, in the isolation environment 256, the modified copy of the setting in the user profile. In still another embodiment, the agent 410 synchronizes the modified copy of the setting in the user profile with a remote version of the setting; for example, by transmitting an identification of the modification to an agent 420 on a remote machine 106. In yet another embodiment, the agent 420 modifies the copy of the setting on the remote machine 106, responsive to the user modification identified by the agent 410.

In one embodiment, the user of the local machine 102 logs off of the local machine 102. In another embodiment, the user logs onto a second machine 102'. In still another embodiment, the user executes a resource provided on the second machine 102'. In still another embodiment, a filter driver 264' on the second machine 102' intercepts a request by the resource for access to the setting in the profile. In still even another embodiment, the filter driver 264' determines whether the setting in the profile is stored in an isolation environment 256' on the second machine 102'. In still another embodiment, the filter driver 264' requests the setting from an agent 410'. In yet another embodiment, the agent 410' retrieves the setting from the remote machine 106. In some embodiments, the agent 410' retrieves, from the remote machine 106, an identification of the modification made by the user on the local machine 102. In one of these embodiments, the agent 410' applies the identified modification to a copy of the setting on the second machine 102'.

Referring back to FIG. 3A, a system 300 for accessing, by a local resource, a setting in a user profile includes an isolation environment, a resource, and a filter driver. In one embodiment, the resource 302 executes on a local machine 102 and outside the isolation environment 256. In another embodiment, the resource 302 attempts to modify a setting on the local machine. In still another embodiment, the resource 302 is an installer application installing a second application onto the local machine. In yet another embodiment, the resource 302 is an installer application selected by a user of the local machine 102.

In one embodiment, the filter driver 264 intercepts the instruction to modify the setting on the local machine. In another embodiment, the filter driver 264 intercepts an instruction to install an application file on the local machine, the installer application executed by the user. In still another embodiment, the filter driver 264 identifies the isolation environment 256, responsive to an application of a rule to the instruction. In yet another embodiment, the filter driver 264 redirects the instruction to modify the setting to the identified isolation environment 256.

In one embodiment, an agent 310 applies a rule to the intercepted instruction. In another embodiment, the agent 310 identifies the isolation environment, responsive to the application of the rule to the instruction. In still another embodiment, the agent 310 applies a rule as described above in connection with FIGS. 3A-3C and 4. In some embodiments, the agent 310 selects the isolation environment 256 from a plurality of isolation environments.

In one embodiment, the identified isolation environment includes a cache memory element. In another embodiment, the identified isolation environment has access to a cache memory element. In still another embodiment, the identified isolation environment stores a copy of the setting.

In one embodiment, data associated with the identified isolation environment includes modified settings and files, settings and files generated by resources on the local machine, user profile data, application files, and other data associated with a user and accessed, modified, or generated on the local machine responsive to an intercepted instruction. In another embodiment, the data associated with the identified isolation environment is synchronized with a copy of the data stored on a remote machine.

In one embodiment, a setting on the local machine may be a file. In another embodiment, the setting is an application file. For example, and in another embodiment, an application or other resource 302 includes a plurality of files. To install the resource 302, the plurality of files is installed onto a machine 102. In still another embodiment, the plurality of files may include registry keys, configuration files, and data files required to execute the resource 302. In yet another embodiment, the plurality of files is stored in a user profile, which may also store other user settings in registry keys, configuration files, and data files. In some embodiments, a user executes an application, such as an installer application, to install a resource into an isolation environment. In one of these embodiments, the requests to modify settings in a user profile made by the installer application (for example, requests to read, write, edit, and create files, including registry keys, configuration files, and data files, in order to install a plurality of files associated with the resource) are intercepted by a filter driver 264 and redirected to the isolation environment, which generates a virtualized user profile.

Figure 5:
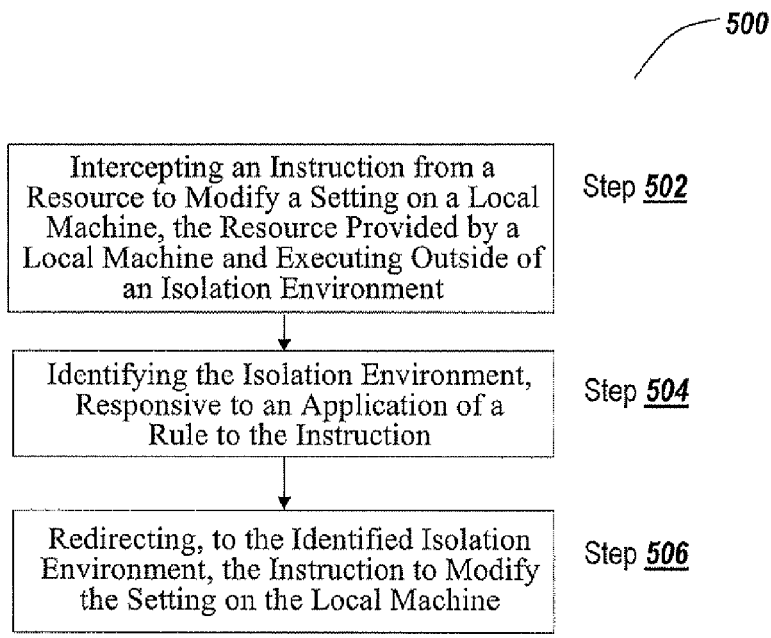
FIG. 5 is a flow diagram depicting one embodiment of the steps taken in a method for modifying, by a local resource, a setting in a virtualized user profile.

Referring now to FIG. 5, a flow diagram depicts one embodiment of the steps taken in a method 500 for modifying, by a local resource, a setting in a virtualized user profile. In brief overview, the method includes the step of intercepting an instruction from a resource to modify a setting on a local machine, the resource provided by a local machine and executing outside an isolation environment (step 502). The method includes the step of identifying the isolation environment, responsive to an application of a rule to the instruction (step 504). The method includes the step of redirecting, to the identified isolation environment, the instruction to modify the setting (step 506).

Referring now to FIG. 5, and in greater detail, an instruction from a resource to modify a setting on a local machine is intercepted (step 502). In one embodiment, an instruction from an installer application to store a file on the local machine 102 is intercepted, the installer application executed by the user. In another embodiment, an instruction from the resource to install at least one application file on the local machine is intercepted, the at least one application file associated with an application the installer application attempts to install on the local machine 102. In still another embodiment, an instruction from the resource to modify a setting in a user profile on the local machine is intercepted. In yet another embodiment, the filter driver 264 intercepts an instruction, from an installer application, to install an application file on the local machine, execution of the installer application initiated by a user of the local machine 102.

An isolation environment is identified, responsive to an application of a rule to the request (step 504). In one embodiment, the filter driver 264 identifies the isolation environment 256. In another embodiment, the agent 410 receives the intercepted request from the filter driver 264 and identifies the isolation environment 256. In still another embodiment, the isolation environment 256 is selected as described above in connection with FIG. 4.

In one embodiment, a user executes the resource issuing the instruction to modify the setting on the local machine. In some embodiments, the user executes the resource, an installer application, to make an application available on the local machine 102. In one of these embodiments, the user subsequently requests access to the application available on the local machine 102 from a second local machine 102'. In another of these embodiments, interception of installation instructions, redirection to an installation environment, and copying of the installation files to a centralized location accessible to the second local machine 102' allows the user to install an application on one machine and access a copy of the requested application from a second machine. In still another of these embodiments, the data stored by the isolation environment and copied to the centralized location form a virtualized user profile.

In other embodiments, the user executes an installer application to make a resource available to a plurality of users; for example, the user may execute an installer application installing a resource onto a local machine and the agent 310 may redirect the installation into an isolation environment generating a virtualized user profile for each member in a group of users. In one of these embodiments, the agent 320 creates an instance of a group profile for each user in the plurality of users. In another embodiment, an agent 310 on the local machine 102 retrieves an instance of the group profile associated with a user of the local machine 102. In yet another embodiment, the group profile contains an application file for executing, on the local machine 102, a resource 302 stored in the user profile, the resource 302 installed by a user in the plurality of users on a second local machine 102.

The request to modify the setting on the local machine is redirected to the identified isolation environment (step 506). In one embodiment, an application file is stored by the identified isolation environment 256. In another embodiment, the setting on the local machine 102 is also modified as instructed. In still another embodiment, data stored by the isolation environment 256 is synchronized with a copy of the data stored on a remote machine 106.

In one embodiment, the filter driver 264 redirects the instruction to the agent 410, which makes a copy of the modified setting prior to allowing the instruction to modify the setting on the local machine to pass to the file system. In still another embodiment, the agent 310 transmits the copy of the modified setting to an agent 320 for packaging and storing on a file server 106' for later access by the user. In yet another embodiment, the agent 310 transmits the copy of the modified setting to a packaging mechanism, as described above in connection with FIG. 2A-2B.

In one embodiment, the agent 310, in communication with a management service 204 on a remote machine 106, identifies an installed application for publication. In another embodiment, the installed application is an application comprising a plurality of files whose installation was redirected to an isolation environment. In still another embodiment, the agent 310 identifies a subset of data stored in the isolation environment 256 as an installed application. In still even another embodiment, the agent 310 identifies the installed application for publication to the agent 320, which transmits the identification to a management service 204. In yet another embodiment, the agent 310 communicates with the common application subsystem 224 to publish the application as described above in connection with FIG. 2A-2B.

In one embodiment, a copy of data stored on the remote machine 106 and associated with the isolation environment 256 on the local machine 102 is synchronized with a copy of the data stored on a second remote machine 106' and associated with a second isolation environment 256'. In some embodiments, the second isolation environment 256' is generated upon interception of the request by a user to execute the second resource 302'. In one of these embodiments, the copy of the data stored on the remote machine 106 and associated with the isolation environment 256 on the local machine 102 is synchronized with data stored in the second isolation environment 256' upon generation of the second isolation environment 256'. In another of these embodiments, the copy of the data stored on the remote machine 106 and associated with the isolation environment 256 on the local machine 102 is synchronized with data stored in the second isolation environment 256' upon interception of a request from the second resource 302 to access the data.

In another embodiment, a second filter driver 264' intercepts a request, by a second resource 302' executing on the second remote machine 102', for access to a setting on the second remote machine 102'. In still another embodiment, the intercepted request is responded to with the synchronized data associated with the second isolation environment 256' on the second remote machine 102'. In some embodiments, the synchronized data is an application file in a plurality of application files forming an executable resource. In one of these embodiments, the intercepted request is a request for the application file, which is accessed to execute the resource. In other embodiments, the second resource is executed responsive to the synchronized data from the second remote machine 102'. In still other embodiments, the second resource 302' executes inside an isolation environment on the second remote machine 102'. In yet other embodiments, the second resource 302' executes outside an isolation environment on the second remote machine 102'.

In one embodiment, a second filter driver 264' intercepts the request, by a second resource 302' executing on a remote machine 102, for access to a setting on the remote machine 102. In another embodiment, the requested setting is retrieved from a copy of the data associated with the isolation environment 256 on the local machine and stored on a second remote machine 106'. In still another embodiment, the requested setting is retrieved from the second remote machine 106', responsive to a determination that the second isolation 256' on the remote machine 102 does not contain the setting. In yet another embodiment, the intercepted request is responded to using the retrieved setting. In some embodiments, the synchronized data is an application file in a plurality of application files forming an executable resource. In one of these embodiments, the intercepted request is a request for the application file, which is accessed to execute the resource. In other embodiments, the second resource is executed responsive to the synchronized data from the second remote machine 102'.

In some embodiments, a setting in a user profile is associated with a user-installed resource 302. In one of these embodiments, the setting provides data for generating a graphical representation, or icon, of the user-installed resource 302. In another of these embodiments, the graphical representation is associated with an instruction to intercept requests triggered by user interactions with the graphical representation. For example, and in still another of these embodiments, when a user selects the graphical representation to request execution of a resource 302 associated with the graphical representation, the filter driver 264 intercepts a command to execute the resource. In still even another of these embodiments, filter driver 264 redirects the request to an agent 410. In still another of these embodiments, the agent 410 determines whether to provide access to a file needed to execute in the requested resource 302 from the copy of the user profile in the isolation environment 256 or by requesting the necessary file from a remote machine 106 storing a copy of the user profile including the file. In yet another of these embodiments, the identified one of the isolation environment 256 and the remote machine 106 responds to the request with the file, resulting in execution of the requested resource 302.

In some embodiments, storing a plurality of application files in the user profile allows a user to select and install resources. In one of these embodiments, the user may execute an installation resource 302 to install a second resource 302', the installation resource 302 attempting to install the second resource 302' on the local machine 102. In another of these embodiments, the installation resource 302 is allowed to install a second resource 302' directly onto the local machine 102. In still another of these embodiments, instructions by the installation resource 302 for the installation of a resource 302 are directed to an isolation environment 256. In another of these embodiments, the application files that comprise the resource 302 are stored in the isolation environment 256. In still another of these embodiments, the application files that comprise the resource 302 are executed within the isolation environment 256. In still even another of these embodiments in which a user profile is stored on a remote machine, when the user accesses a different computing environment than the environment in which the user installed the resource 302—for example, from a second machine 102'—the user profile may be synchronized with a user profile on the second machine 102', making the installed resource 302 available to the user from the second machine 102'. In yet another of these embodiments, in synchronizing the user profile on the remote machine with the user profile on the second machine 102', the system allows a user to more rapidly and efficiently access a resource not previously installed on the second machine 102 while providing the user with a mechanism (such as the agent 410) for maintaining synchronized files and data for later use from yet other computing environments.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

Having described certain embodiments of methods and systems for accessing, by a local resource, a setting in a virtualized user profile, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of utilizing a virtualized user profile, the method comprising:
   intercepting, by a filter driver executed by a processor of a local machine that has a local copy of a user profile, a first instruction by a first application executing on the local machine, the first instruction seeking to access a first setting in the user profile on the local machine;
   identifying, by application of a set of rules to a property of a network connection of the local machine to the remote machine responsive to intercepting the first instruction, that latency is high or that bandwidth is low, wherein the property is one of latency and bandwidth;
   determining, responsive to intercepting the first instruction and identifying that latency is high or that bandwidth is low, to use the local copy of the user profile located on the local machine;
   directing, by the filter driver, the first instruction to the local copy of the user profile based on determining to use the local copy of the user profile located on the local machine;
   intercepting, by the filter driver, a second instruction by a second application executing on the local machine, the second instruction seeking to access a second setting in the user profile on the local machine;
   identifying, by application of the set of rules responsive to intercepting the second instruction, that latency is low and bandwidth is high;
   determining, responsive to intercepting the second instruction and identifying by application of the set of rules to the property of the network connection that latency is low and bandwidth is high, to use a remote copy of the user profile located on a remote machine instead of the local copy of the user profile; and
   directing, by the filter driver, the second instruction to the remote copy of the user profile based on determining to use the remote copy of the user profile located on the remote machine.

2. The method of claim 1, wherein the local copy of the user profile is in an isolation environment provided by the local machine and the application is executing outside of the isolation environment.

3. The method of claim 1, further comprising:
   synchronizing the local copy of the user profile and the remote copy of the user profile via a second network connection of the local machine to the remote machine having high bandwidth.

4. The method of claim 1, wherein the instruction accessing a setting in a user profile on the local machine is for accessing one of: a configuration file, a registry key, and a data file.

5. The method of claim 1, wherein the remote copy of the user profile is in an isolation environment provided by the remote machine.

6. The method of claim 1, further comprising receiving, at the local machine, a request to access the local copy of the user profile from a remote machine.

7. The method of claim 1, further comprising identifying, by the filter driver, a modification to the second setting and transmitting, to the remote machine, an identification of the modification.

8. The method of claim 1, further comprising identifying the set of rules based on the intercepted instruction.

9. The method of claim 1, wherein the set of rules includes a rule for a wireless network link.

10. The method of claim 1, wherein the first instruction is a modification request to modify the first setting, the second setting is the first setting so modified, and the second instruction is a read request to read the second setting, the method further comprising synchronizing the local copy of the user profile and the remote copy of the user profile after intercepting the first instruction and prior to directing the second instruction to the remote copy of the user profile.

11. A system for utilizing a virtualized user profile, the system comprising:
   an application executed by a processor of a local machine, wherein the local machine has a local copy of a user profile; and
   a filter driver executed by the processor, the filter driver configured to:
      intercept a first instruction by the application seeking to access a first setting in the user profile on the local machine;
      identify, by application of a set of rules to a property of a network connection of the local machine to the remote machine responsive to intercepting the first instruction, that latency is high or that bandwidth is low;
      determine, responsive to intercepting the first instruction and identifying that latency is high or that bandwidth is low, to use the local copy of the user profile located on the local machine;
      direct the first instruction to the local copy of the user profile based on determining to use the local copy of the user profile located on the local machine;
      intercept a second instruction by the application seeking to access a second setting in the user profile on the local machine;
      identifying, by application of the set of rules responsive to intercepting the second instruction, that latency is low and bandwidth is high;
      determine, responsive to intercepting the second instruction and identifying by application of the set of rules to the property of the network connection that latency is low and bandwidth is high, to use a remote copy of the user profile located on a remote machine instead of the local copy of the user profile; and
      directing the second instruction to the remote copy of the user profile based on determining to use the remote copy of the user profile located on the remote machine.

12. The system of claim 11, wherein the local copy of the user profile is in an isolation environment provided by the local machine and the application is executing outside of the isolation environment.

13. The system of claim 11, the filter driver further configured to
   synchronize the local copy of the user profile and the remote copy of the user profile via a second network connection of the local machine to the remote machine having high bandwidth.

14. The system of claim 11, wherein the instruction accessing a setting in a user profile on the local machine is for accessing one of: a configuration file, a registry key, and a data file.

15. The system of claim 11, wherein the remote copy of the user profile is in an isolation environment provided by the remote machine.

16. The system of claim 11, the filter driver further configured to receive, at the local machine, a request to access the local copy of the user profile from the remote machine.

17. The system of claim 11, the filter driver further configured to identify a modification to the second setting and transmit, to the remote machine, an identification of the modification.

18. The system of claim 11, the filter driver further configured to identify the set of rules based on the intercepted instruction.

19. The system of claim 11, wherein the set of rules includes a rule for a wireless network link.

20. The system of claim 11, wherein the first instruction is a modification request to modify the first setting, the second setting is the first setting so modified, and the second instruction is a read request to read the second setting, the filter driver further configured to synchronize the local copy of the user profile and the remote copy of the user profile after intercepting the first instruction and prior to directing the second instruction to the remote copy of the user profile.

* * * * *